United States Patent [19]

Mitsuyama et al.

[11] Patent Number: 5,768,412

[45] Date of Patent: Jun. 16, 1998

[54] REGION SEGMENTATION METHOD FOR PARTICLE IMAGES AND APPARATUS THEREOF

[75] Inventors: Satoshi Mitsuyama, Tokyo; Jun Motoike; Akihide Hashizume, both of Hachioji, all of Japan

[73] Assignee: Hitachi, Ltd., Tokyo, Japan

[21] Appl. No.: 523,523

[22] Filed: Sep. 1, 1995

[30] Foreign Application Priority Data

Sep. 19, 1994 [JP] Japan .................................. 6-223028

[51] Int. Cl.$^6$ .............................. G06K 9/34; G06K 9/00
[52] U.S. Cl. ........................ 382/173; 382/133; 382/164
[58] Field of Search ................................ 382/173, 128, 382/130, 164, 270, 272, 133, 134, 172, 171; 364/413.13

[56] References Cited

U.S. PATENT DOCUMENTS

| | | | |
|---|---|---|---|
| 4,338,024 | 7/1982 | Bolz et al. | 356/23 |
| 5,036,464 | 7/1991 | Gillies et al. | 364/413.13 |
| 5,432,865 | 7/1995 | Kasdan et al. | 382/128 |
| 5,528,703 | 6/1996 | Lee | 382/283 |
| 5,544,650 | 8/1996 | Boon et al. | 382/133 |

FOREIGN PATENT DOCUMENTS

| | | |
|---|---|---|
| 57-500995 | 6/1982 | Japan . |
| 63-94156 | 4/1988 | Japan . |
| 1119765 | 5/1989 | Japan . |
| 5296915 | 11/1993 | Japan . |
| 6314338 | 11/1994 | Japan . |

*Primary Examiner*—Leo Boudreau
*Assistant Examiner*—Bhavesh Mehta
*Attorney, Agent, or Firm*—Antonelli, Terry, Stout, & Kraus, LLP

[57] ABSTRACT

In a region segmentation method for particle images, which photographs stained and non-stained object particles supplied through an image input optical system and which uses at least two of the red-colored image, green-colored image and blue-colored image to discriminate between a background region and an object region where the object particles exist, the region segmentation method includes the processes of: a first process of setting a first group of thresholds in density value for a first group of at least two images selected from the red-colored image, green-colored image and blue-colored image to extract regions greatly differing in density from the background region, and producing a first binary image from the first group of images; a second process of calculating for each pixel a quantity representing the magnitude of change of density in an area neighboring each of the pixels making up each of one or more second group images selected from the red-colored image, green-colored image and blue-colored image, comparing a change of density in the background region with the quantity representing the magnitude of change of density calculated for each pixel, setting a second group of thresholds for extracting regions whose cane of density is larger than tat of the background region, and producing a second binary image from the second group of images; and a third process of performing a logic operation on the first binary image and the second binary image to produce a third binary image showing the background region and the object region.

44 Claims, 25 Drawing Sheets

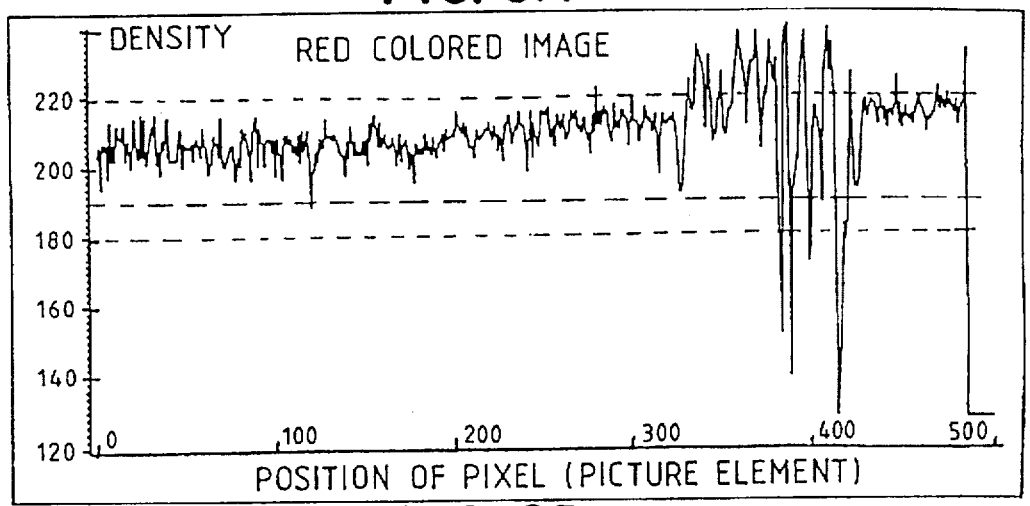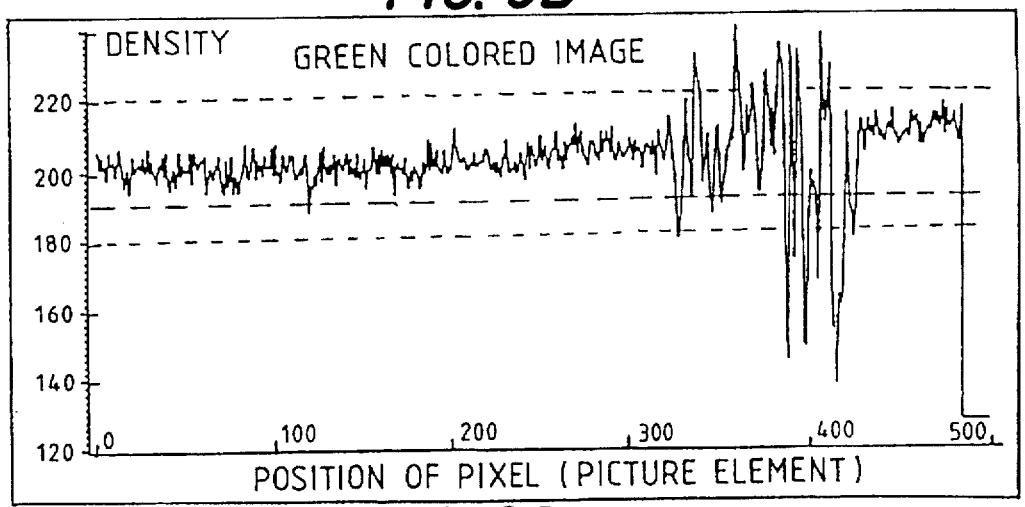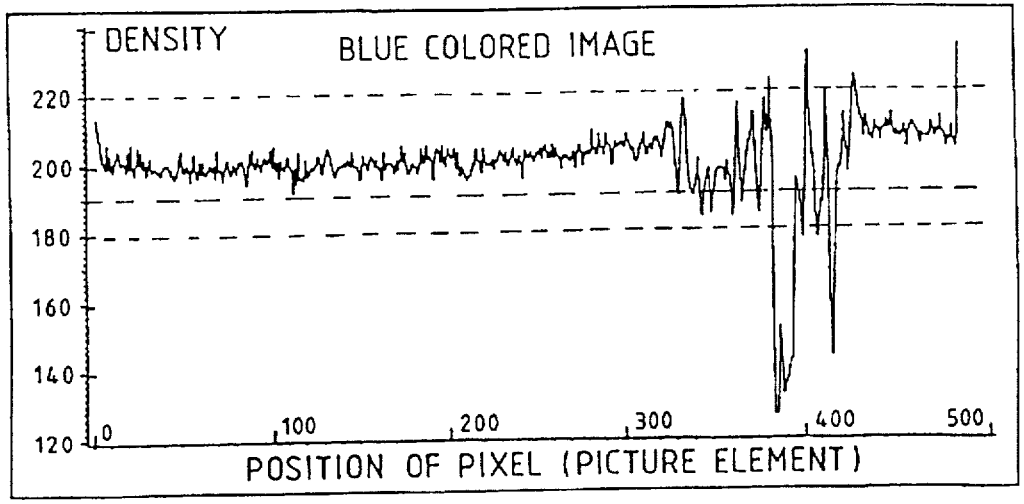

FIG. IIA
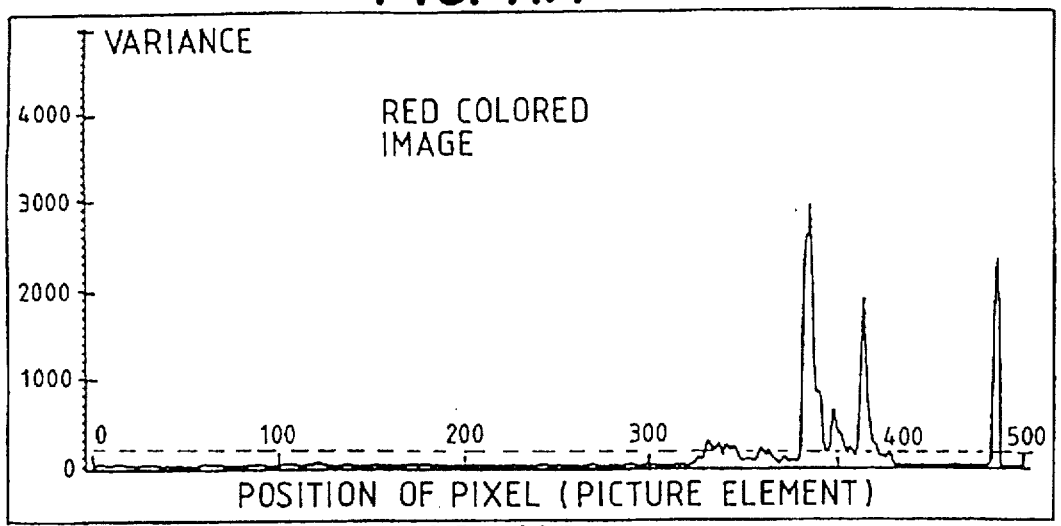
FIG. IIB
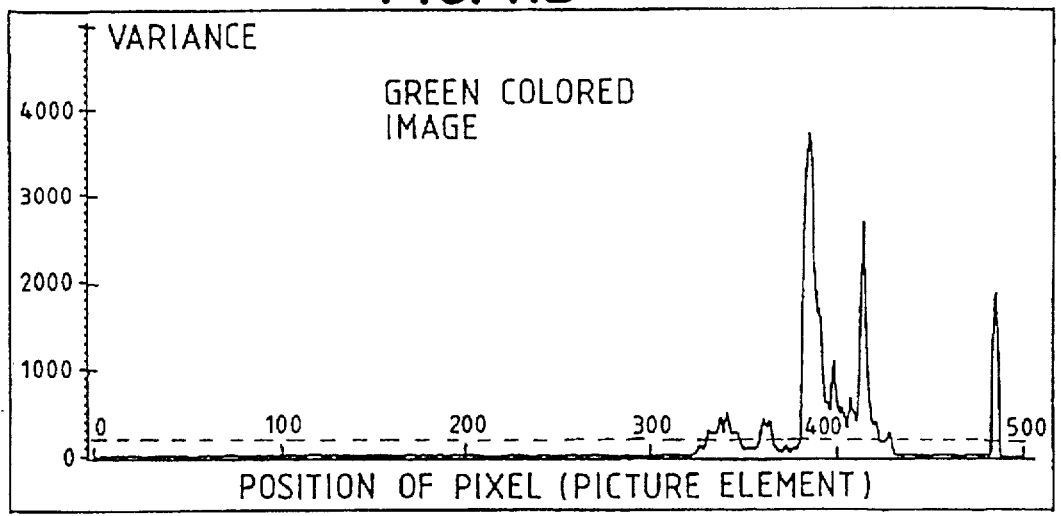
FIG. IIC
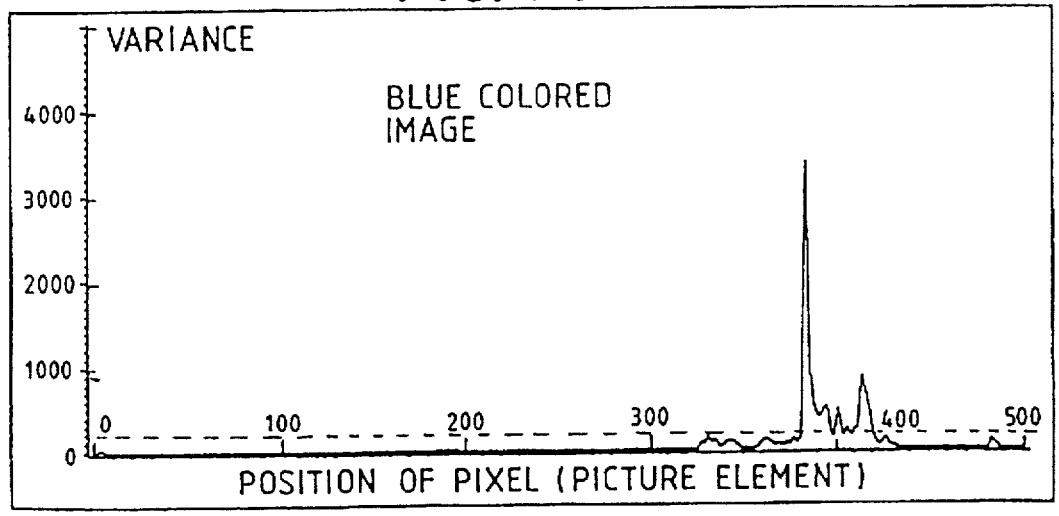

REGION SEGMENTATION METHOD FOR PARTICLE IMAGES AND APPARATUS THEREOF

BACKGROUND OF THE INVENTION

The present invention relates to a region segmentation method for particle images that uses color information and density information and more particularly to a region segmentation method and apparatus suited for dividing particle images in blood and urine.

To make a morphologic examination on particles in urine, the conventional visual method involves centrifuging a urine sample, dyeing sediments to make a urine specimen on a slide glass, and observing it with a microscope. In that case, the kind and density of sediments in the urine specimen are determined by centrifuging the sample to a fixed concentration level and observing a fixed amount of specimen. Contained in the sediments are a variety of sizes of particles, from several micrometers across, such as blood cells and bacteria or germs, to several hundred micrometers long such as columnar particles. These particles of varying sizes have been observed by changing the magnifying power of microscope between high and lower magnifying powers.

The conventional visual examination by microscopic observation has drawbacks that (1) the method using a slide glass has low throughput and that (2) it is difficult to handle urine specimens that will quickly rot.

In recent years, a shift is being made from the conventional inspection method using slide glass specimens to a flow method that permits direct inspection of blood samples as a liquid specimen. The flow method is expected to realize a high-speed examination of specimens.

A technique to analyze and classify particles based on individual particle images produced by imaging the particles in a continuously flowing sample is described in Japan Patent Laid-Open No. 500995/1982 and 94156/1988.

Japan Patent Laid-Open No. 500995/1982 describes a particle analyzing method, which involves passing a specimen through a path of a special shape, flowing particles of the specimen into a wide imaging area, photographing a static image by using a flash lamp, and analyzing the particles based on the static image. When projecting an enlarged image of sample particles onto a CCD camera by using a microscope, a flash lamp as a pulse light source periodically flashes in synchronism with the operation of the CCD camera. The time in which the pulse light source is illuminated is so short that even when the particles are flowing continuously, their static images can be obtained. With the CCD camera, it is possible to shoot 30 static images a second.

Japan Patent Laid-Open No. 94156/1988 describes placing an optical system for detecting passing particles—which is separate from the static image photographing system—at a position upstream of the particle imaging area for sample flow. In this method, when the particles are detected by the particle detector to reach the particle imaging area, the flash lamp is illuminated at an appropriate timing. This method, rather than flashing the pulse light source periodically, illuminates the flash lamp in synchronism with the detection of passage of particles to photograph a static image. As a result, it is possible to obtain particle images efficiently. In the case of a sample with low concentration, the static image of sample flow is not shot where no particles exist, thereby eliminating unnecessary image processing.

Japan Patent Laid-Open No. 296915/1993 describes a method whereby an optical system for detecting particles is incorporated into the particle imaging system. This method irradiates a laser light bundle against the sample flow through a microscopic condenser lens of the microscopic imaging system to detect particles. With this method, there is no need to prepare an optical system for detecting particles and the particle detection position can be put as close to the particle image intake area as possible.

One example of such a conventional image area segmentation method is found in Japan Patent Laid-Open No. 119765/1989, which describes a region segmentation method for classifying blood corpuscle images. This technique divides an image area in the color space by using a threshold determined by gray level histogram of image.

SUMMARY OF THE INVENTION

In the case of a density distribution in which the density of the particle images to be analyzed is distributed over a wide range from low density to high density, however, the conventional technique cannot always offer precise region segmentation. Further, because the density distribution characteristic to be analyzed differs from one color tone to another, if a binary image of a number of particles is subjected to the same image processing, a correct region cannot always be obtained.

In the case of urine sediments, the urine specimen is usually stained to prevent misidentification of sediment component and to allow easy Judgment on the cell. There are some known methods for photographing the image of stained biospecimen and extracting the object particles in the color space. In the urine sediment inspection apparatus, however, the object particles to be extracted by region segmentation have properties varying in wide ranges as shown below.

(1) The size distribution of the object particles ranges widely from several pm to several hundred pm.

(2) A plurality of particles with different color tones exist in the same image.

(3) The density of object particles may vary from small values to large values.

(4) Even of the same kind, some cells stain dark and some stain light.

(5) The object particles may have a density almost equal to or lower than the density of background.

(6) Particles that are stained well and those that are not stained easily by specimen coloring (particles that do not stain well or nearly at all) are mixed.

Because the object particles in the urine sediment inspection apparatus have widely varying properties, the conventional region segmentation method cannot be applied as is.

When the object particles are not stained well, there is almost no difference between the density of cytoplasm and the density of background, with the density becoming uniform over the entire region where the object particles exist, making it impossible to extract a precise binary image.

Highly active cells have poor staining characteristics and there are those that can hardly be stained. In an image containing such cells, because the color tone of the object region where the object particles exist and the color tone of background are almost same and there are many portions within the object region whose densities are almost equal to the density of the background, it is impossible to extract such cells correctly.

When the object particles cannot be stained well and a correct binary image not extracted, the feature parameters of the object region cannot be determined precisely, leading to wrong discrimination of the object particles.

Because object particles, such as cells, with poor staining characteristic are frequently encountered, the conventional technique cannot always perform precise region segmentation for all particles contained in the specimen, improvement of accuracy in discriminating the sediment components is expected.

The above-mentioned problems are solved by this invention in the following manner. That is, in a region segmentation method whereby particles scattered in a fluid are photographed and recorded as a static image and object particles are extracted from the static image, a first object of this invention is to provide a region segmentation method that can correctly extract particle images even with varying densities and color tones from the static image by performing a stable region segmentation on the static image.

A second object of this invention is to provide a region segmentation method that can extract particle images precisely from the static image by performing stable region segmentation on the static image even when the difference in color tone between the particle images and the background region is small and when the object region where object particles exist has many areas with densities almost equal to that of the background region.

A third object of this invention is to provide a region segmentation method that can extract particle images precisely from the static image by performing stable region segmentation on the static image even when the particle images have differing densities and differing color tones, when the difference in color tone between the particle images and the background region is small and when the object region where object particles exist has many areas with densities almost equal to or lower than that of the background region.

<1> A first configuration to realize the first objective of this invention is described below. The first objective is realized by a region segmentation method, which photographs a stained liquid flow specimen containing stained object particles, produces static images of the stained object particles from a red component image (red-colored image), a green component image (green-colored image) and a blue component image (blue-colored image) that are separated from each other by an image input optical system, and uses two or more of the red-colored image, green-colored image and blue-colored image to discriminate between a background region and object regions where the object particles exist, and which includes a process of selecting at least two images from the red-colored image, green-colored image and blue-colored image and correcting density irregularities present in the selected two images and caused by distortions of the image input optical system and another process of using the selected two images and a plurality of thresholds (T1, T2, T3, T4), identifying the background region, generating from the two images a binary image that shows the background region and regions other than the background region, i.e., object regions where object particles exist, and thereby extracting the object regions. With this configuration it is possible to extract object particles, urine sediment components to be identified, from the binary image.

The correction of density irregularities caused by distortion of the image input optical system reduces deviation of density variation in at least the selected two images, allowing stable and correct discrimination and extraction of the background region. It is preferred that the green-colored image and the red-colored image be selected as the two images.

In images obtained with the urine sedimentation inspection apparatus, the background region is known to be normally stable. Hence, by taking the background region as a reference it is possible to discriminate object regions where object particles exist. That is, because the background region can be stably extracted, signal components representing object particles to be discriminated from the background region can all be considered to be included in regions other than the background region.

The process of generating the binary image will be explained in the following, with the green-colored image and the red-colored image taken as the two selected images. The density histogram is produced for each of the green-colored image and the redcolored image, and the density value that gives the maximum peak value in the histogram is determined. Next, thresholds T1, T2 are determined from the density histogram of the red-colored image and thresholds T3, T4 from the density histogram of the green-colored image in order to extract the background region.

The outline procedure for determining the thresholds and extracting the background region is explained below.

(Procedure 1) A density histogram is generated for each image (green-colored image and red-colored image).

(Procedure 2) A density value (maximum density value) that has the maximum frequency in each density histogram is determined.

(Procedure 3) A density that gives half the peak in each density histogram is determined.

(Procedure 4) The thresholds T1, T2, T3, T4 are calculated from the maximum density value and the density giving the half of the peak, both determined in (Procedure 1) to (Procedure 3), and from predetermined parameters.

(Procedure 5) Based on the thresholds T1, T2, T3, T4 calculated in (Procedure 1) to (Procedure 4), a binary image is generated in an image space. The background region is determined from Equation (1) below.

$$\{T1 \leq R(i,j) < T2\} \cap \{T3 < G(i,j) < T4\} \qquad (1)$$

where $\cap$ represents a logical AND, (i,j) represents the location of a pixel, and R(i,j) and G(i,j) represent the red-colored image and the green-colored image whose density irregularities caused by distortion of the image input optical system were corrected.

In the first configuration of this invention, the above procedures allow accurate region segmentation even when the density of object particles in the images (images of a stained specimen that are to be region-segmented) is widely distributed from small to large values. Further, when the density distribution characteristics of objects vary depending on color tones, accurate region segmentation can be performed. If, when extracting object particles from the images of stained specimens, the particle images have differences in density and color tone, the region segmentation can be performed stably and accurately without being affected by the density and color tone differences. As a result, if the binary images after region segmentation are processed under the same condition, the object regions can be recognized precisely.

<2> A second configuration to realize the second objective of this invention is described below. The second objective is realized by a region segmentation method, which photographs a stained liquid flow specimen containing stained object particles, produces static images of the stained object particles from a red component image (red-colored image), a green component image (green-colored image) and a blue component image (blue-colored image) that are separated from each other by an image input optical system, and uses one of the red-colored image, green-colored image and blue-colored image to discriminate between a background region and object regions where the object particles exist, and which includes: a process of selecting one image from the red-colored image, green-colored image and blue-colored image and correcting density irregularities present in the selected image and caused by distortions of the image input optical system; a process of setting a first group of thresholds (first and second threshold) in density value for the selected image to extract regions greatly differing in density from the background region, and producing a first binary image; a process of calculating for each point a quantity representing the magnitude of change of density in an area neighboring each of the points making up the selected image, comparing a change of density in the background region with the quantity representing the magnitude of change of density calculated for each point, setting a second group of thresholds (third threshold or fourth and fifth threshold) for extracting regions whose change of density is larger than that of the background region, and producing a second binary image; and a process of performing a logic operation, for example, logical OR, on the first binary image and the second binary image to produce a third binary image that shows the background region and the object region, other than the background region, where the object particles exist, for precise detection of the background region and the object region.

The quantity representing the magnitude of change of density uses, for example, (1) a difference between sums of densities in each of two small adjacent areas in the image or an absolute value of the difference, (2) a variance or standard deviation of distribution of density in the small areas in the image, (3) a weighted sum of densities for pixels included in the small areas in the image or an absolute value of the weighted sum, or (4) a value obtained by taking one of the values of (1) to (3) (quantity representing the magnitude of change of density) as a new density value and performing the processes (1) to (3) one or more times. It is preferred that the green-colored image be selected as the image for the above processing.

In the second configuration of this invention, when only positive values are used for the quantity representing the magnitude of change of density (a value obtained by the above process (1) to (4)), if, abscissa indicates the density for each point in the image and ordinate indicates the quantity representing the magnitude of change of density, then the density distribution is such as shown in FIG. 1, in which the background region is represented by BG, an object having density higher than that of the background region is represented by A1, an object having density lower than that of the background region is represented by A2, and an object whose density difference from the background region is small and the change of density is greater than that of the background region is represented by B. Thresholds T1', T2' are set for density and threshold T3' is set for the magnitude of change of density to discriminate the background region and the object regions in the image.

When the quantity representing the magnitude of change of density assumes negative values, too, then the density distribution is such as shown in FIG. 2, in which the background region is represented by BG, an object having density higher than that of the background region is represented by A1, an object having density lower than that of the background region is represented by A2, and an object whose density difference from the background region is small and the change of density is greater than that of the background region is represented by B1 and B2. In this case, thresholds T1', T2' are set for density and threshold T3", T4' are set for the magnitude of change of density to discriminate the background region and the object regions in the image. When the process (4) is applied, the object regions can be extracted more accurately on the basis of the thresholds set for the magnitude of change of density.

Further, in the urine sediment inspection apparatus required to extract object particles having widely varying characteristics, when the object particles are not well stained so that there is almost no difference in density between the object particles and the, background region and when the specimen contains many such poorly stained particles with high frequency, the second configuration of this invention makes it possible to extract the object particles. Even when the specimen contains cells hardly stained so that the tone difference is small between the background region and the object regions where object particles exist and when the object region contains many areas with density almost equal to or lower than that of the background region, the second configuration enables such object particles to be stably and accurately extracted through simple computation without reducing the processing speed.

<3> A third configuration to realize the third objective of this invention is described below. The third objective is realized by a region segmentation method, which photographs a stained liquid flow specimen containing stained object particles, produces static images of the stained object particles from a red component image (red-colored image), a green component image (green-colored image) and a blue component image (blue-colored image) that are separated from each other by an image input optical system, and uses two or more of the red-colored image, green-colored image and blue-colored image to discriminate between a background region and object regions where the object particles exist, and which includes: a step A of selecting at least two images from the red-colored image, green-colored image and blue-colored image and correcting density irregularities present in the selected two images and caused by distortions of the image input optical system; a step B of selecting one of the two images and calculating for each point a quantity representing the magnitude of change of density in an area neighboring each of the points making up the selected image, comparing a change of density in the background region with the quantity representing the magnitude of change of density calculated for each point, setting a first group of thresholds (first threshold or second and third threshold) for extracting regions whose change of density is larger than that of the background region, and producing a first binary image; A step C of setting a plurality of thresholds (T1, T2, T3, T4) for the density of the two images, discriminating the background region in the selected image, and generating a second binary image that shows the background region and the object regions where the object particles exist; and a step D of performing a logic operation (logical OR) on the first binary image and the second binary image to produce a third binary image for detecting the object regions.

It is preferred that the green-colored image and the red-colored image be used as the two images in the above step A and that the green-colored image be used as the one selected image in the step B. Whichever of the step B and the step C may be executed first. It is more preferred that the step B and the step C be performed simultaneously to reduce the processing time.

<4> A fourth configuration to realize the third objective of this invention is described below. This is the configuration which performs a logic operation (logical OR) on two or three of the binary images produced in the first to third configuration to obtain another result of region segmentation. In the first configuration, two or three images may be selected from the green-colored image, red-colored image and blue-colored image and undergo processing to produce a plurality of third binary images. These third binary images may then be subjected to a logical operation, such as logical OR, to extract the object regions where the object particles exist.

In the third and fourth configuration of this invention, even when the stained specimen contains a mixture of well stained particles and particles not easily stained (those not well stained and those hardly stained), the region segmentation can be stably performed for each particle image, producing more precise binary images. This in turn allows the feature parameters of the object regions to be determined more precisely, preventing erroneous discrimination of the object particles. In this way, even when the specimen contains object particles having differing degrees of staining and poorly or hardly stained object particles, the method of this invention permits accurate region segmentation to be performed for each of the particle images, improving the discriminating rate of a variety of kinds of urine sediments.

BRIEF DESCRIPTION OF THE DRAWINGS

FIG. 8 and FIG. 9 are example graphs showing densities of images containing well-stained cells and of images containing hardly stained cells, in the second embodiment of this invention;

FIG. 10 and FIG. 11 are example graphs showing variances of images containing well stained cells and of images containing hardly stained cells in the second embodiment of this invention;

DESCRIPTION OF PREFERRED EMBODIMENTS

First, a urine sediment inspection to which the method of this invention can suitably be applied is described.

The urine sediment specimen is often stained to prevent misidentification of the sediment components and to make correct judgment of cells. Representative staining techniques include the Sternheimer-Malbin (SM) stain method and the Sternheimer (S) modified stain method. The SM stain method is mainly used widely for staining white blood cells. The S modified stain method (hereinafter referred to as S stain method) uses alcian blue or astral blue and Pyronin B, all basic dyes. This stain method has the advantage that because nuclei and cast stromata are clearly colored in blue and cytoplasms and RNA components are colored in red by Pyronin B, a high contrast between red and blue can be obtained. Many other stain methods are known. The urine sediment inspection uses stained specimens and makes many checks including discrimination of blood cells and columnar epithelial cells, counting of the number of these cells, identification of the kind of crystals, judgment on the presence or absence of germs including yeast-like fungi, and determination of the kind of germs.

In the following embodiments we will explain the image region segmentation performed by a urine sediment inspection apparatus that automatically analyzes solid materials (sediments) in urine dyed, for example, by Sternheimer modified stain method.

In each of the following embodiments, the stained urine specimen is fed, without being centrifuged, into a flow cell that forms a flat sheath flow; in synchronism with sediment particles flowing in the flow cell, a pulse light is irradiated against the flow cell to photograph a static image of the flowing sediment particles with a TV camera; and the static image is subjected to an image processing to identify the urine sediments. The image processing referred to in the following embodiments is capable of high-speed processing in synchronism with the TV camera's imaging period of up to 1/30 seconds to identify a plurality of sediments (object particles to be inspected) present in the image photographed and recorded.

Figure 1:
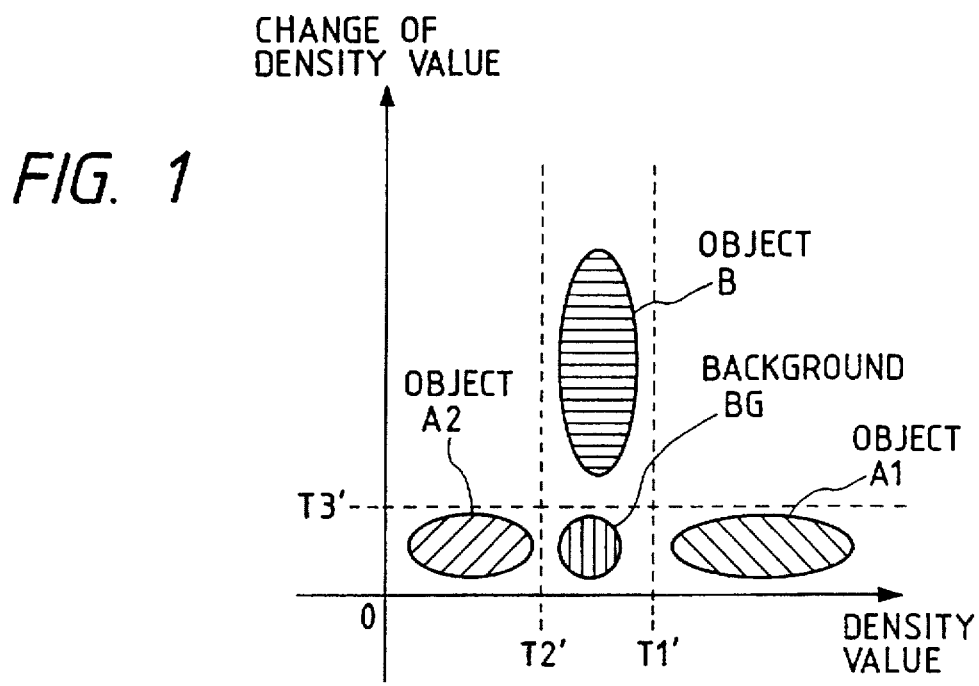
FIG. 1 and FIG. 2 are diagrams explaining the working principle of the region segmentation method for particle image as a second embodiment of this invention.
Figure 2:
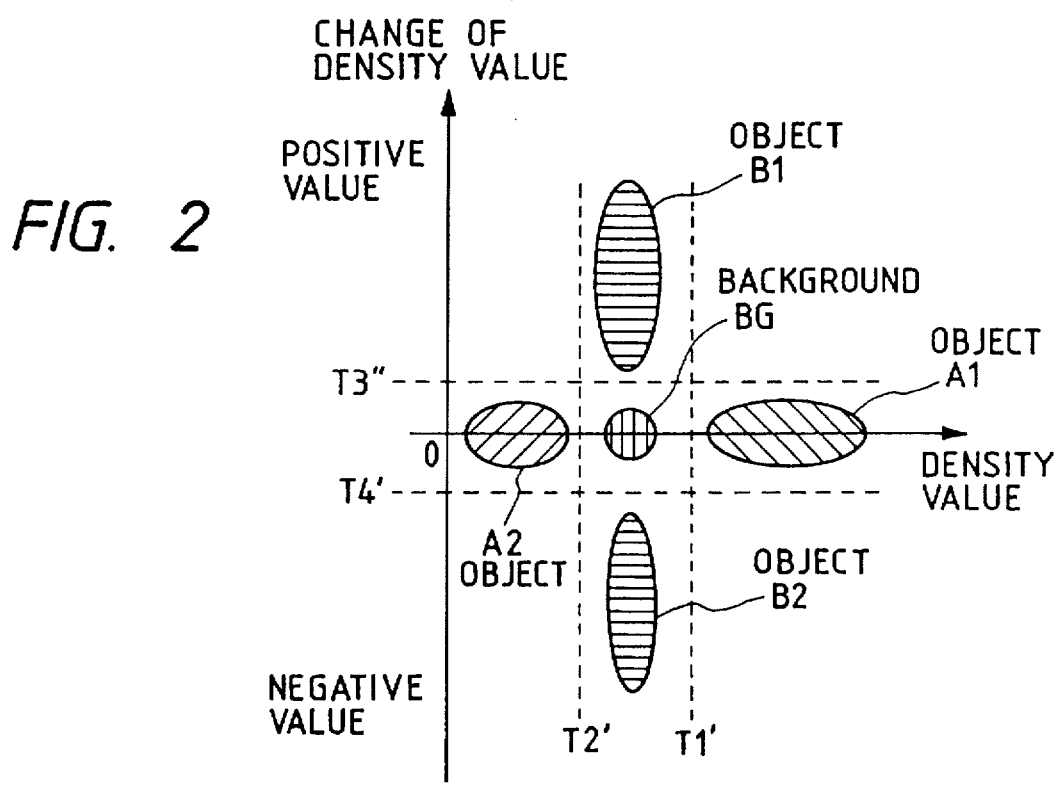
Figure 3A:
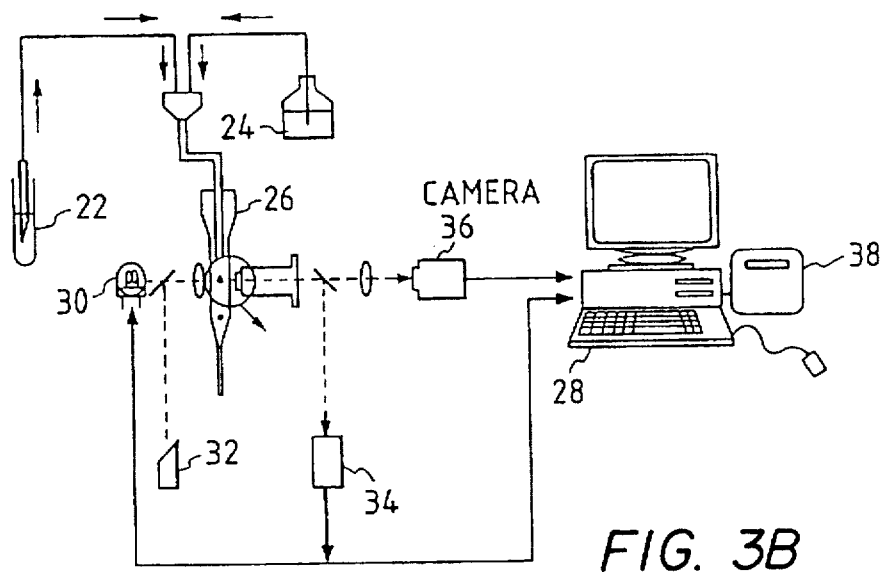
FIG. 3 is a schematic diagram showing an example configuration of a urine sediment inspection apparatus that applies the region segmentation method of this invention.
Figure 3B:
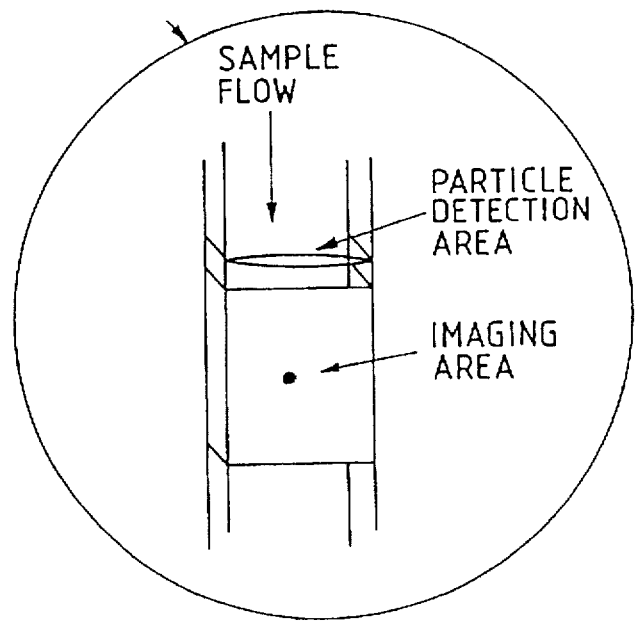

FIG. 3 shows an example configuration of the urine sediment inspection apparatus. A urine specimen 22 is stained by being mixed with a stainer 24, is formed into a flat shape of a specified thickness and width in a flow cell 26, and then flows at a uniform speed enclosed by a sheath liquid in a space of a specified dimension. In this apparatus, a beam of light from a semiconductor laser 32 is irradiated against a particle detection area located before the imaging area. The particles passing through the particle detection area are detected by a particle detector 34. Based on a detection signal from the particle detector 34, a flash lamp (Xe lamp) 30 is illuminated for a short predetermined period with a predetermined delay (a time taken by the particles to enter the imaging area from the particle detection area) to photograph the imaging area with a TV camera 36 through an optical system (including objective and relay lenses). The output signal of the TV camera 36 is A/D-converted for each wavelength of red-, greenand blue-colored images by an image processing board in a personal computer 28 to quantize these images into digital images of 512 pixels×512 pixels×8 bits (786,432 bytes of data) which are stored in an image memory 38. At this time, the output of the A/D converter (not shown) has 0 for a black level of camera and 255 for a white level. In the following processing, however, to represent an object in a light absorption rate for convenience of processing, the black level is represented by 255 and the white level by 0.

The image input optical system has a lens moving mechanism for magnification installed between the objective and the camera, so that density irregularities occur due to distortion of the optical system. To correct and eliminate the density irregularities, a gray level correction process is performed before the region segmentation processing. This correction is done for each of the red-, green- and blue-colored images independently. The images that meet the most preferred conditions for the staining technique used on the specimen are selected beforehand as the images that are to undergo the gray level correction.

In an image photographed when there is no object or when an object has a uniform optical characteristic with an infinitely small light absorption rate (a white image) and in an image photographed when an object has an infinitely large light absorption rate (a black image), pixels in these images theoretically have uniform values. In reality, however, there are density irregularities on the background due to distortions of the optical system. Hence, by using actually measured white image W(i,j) and black image B(i,j), an input image f(i,j) is corrected and converted into an image f'(i,j) corrected for distortion. An image f is either red-, green- or blue-colored image and (i,j) represents the position of a pixel in the image. If we let a-reference value of black level be $\beta_o$ and that of white level be $\alpha_o$, and if the relative value of the input image f(i,j) is to be represented in the amplitude range of $[\beta_o, \alpha_o]$, then the distortion-corrected image f'(i,J) can be expressed by Equation (2) shown below.

$$f'(i,j) = \frac{(\beta_0 - \alpha_0)\{f(i,j) - W(i,j)\}}{\{B(i,j) - W(i,j)\} + \alpha_0} \quad (2)$$

where i=0, 1, 2, . . . , 510, 511 and j=0, 1, 2, . . . , 510, 511.

If, the black image B(i,j) is replaced with its average value $B_{av}$, when the variance of the black image B(i,j), after being A/D converted, can be approximated to be below level 1, and if reference is made not to pixels of the white image W(i,j) but to pixels of a white image W'(i',j') in a small area, the similar correction to the above can be made according to Equation (3) shown below.

$$f'(i,j) = \frac{(\beta_0 - \alpha_0)\{f(i,j) - W(i',j')\}}{\{B_{av} - W(i',j')\} + \alpha_0} \quad (3)$$

Here, if we take the size of the small area of the white image to be referenced as M×N, (i',J') represents coordinates to be referenced and, i'=[i/M]

J'=[J/N] (4)

where [ ] represents a gauss symbol. If, for instance, M=N=8, the size of the white image W' will be such as can be covered by an area of 64×64 pixels.

The reference value $\beta_O$ of black level and the reference value $\alpha_O$ for white level are set to around $\beta_q$=230 and $\alpha_O$=40 for red-, green- and blue-colored images.

Influences of noise on white image can be reduced by performing the smoothing process within the image or by measuring a plurality of white images and averaging or smoothing the measurements. This correction makes the density of the photographed color image almost uniform over the entire image. The image correction can of course be omitted when the distortions of the optical system can be virtually ignored.

These processes are commonly performed prior to the region segmentation in each of the following embodiments.

(Embodiment 1)

In this embodiment, for efficient division of particles of different sizes (several micrometers to several hundred micrometers) present in an image photographed by the flow method, an image that is input from the TV camera for each wavelength is corrected for the density irregularities of the optical system and then the color space of red- and green-colored images is divided between the background region and the object region where object particles exist to produce binary images representing the background region and the object region that includes object particles.

This embodiment locates and picks up a region containing sediment components from the image of specimen that is stained by the S stain having high blue and red contrasts which is suited for automatic discrimination of object particles being examined. The region segmentation is performed by taking the background region in the image as a reference. Prior to the region segmentation, the correction process mentioned above is performed to correct the density irregularity of the optical system and thereby minimize density variations for stable extraction of the background region.

Now, the process of region segmentation is detailed below.

In extracting an object region where object particles exist from the image of specimen stained by S stain, the region segmentation method described below has the advantage of being able to stably locate even a particle image having density variations or color tone variations.

There are some known methods to extract object substances (particles) in the color space by photographing the image of stained biospecimen. In the urine sediment inspection apparatus, however, the object to be extracted by region segmentation has widely varying properties, as mentioned earlier, and thus the conventional region segmentation method cannot be applied as is.

Studies conducted by the inventor of this invention have found that the images obtained with the urine sediment inspection apparatus are normally stable in the background region. Hence, to detect the object particles, this invention first discriminates the background region that exists in stable condition, and then takes it as a reference. That is, if the background region can be stably extracted, signal components representing the object particles to be discriminated from the background region are considered to all lie in regions other than the background region.

The results of measurements of typical sediment particles using a micro-optical densitometer show that the absorption peak of dye lies at around 550 nm and that the sensitivity in the wavelength zone of 500–700 nm (green and red color components) is higher than in the 400–500 nm wavelength zone. This clearly indicates that in the case of an image of specimen stained by S stain, the region segmentation should preferably be performed in the green- and red-colored image spaces.

Figure 4:
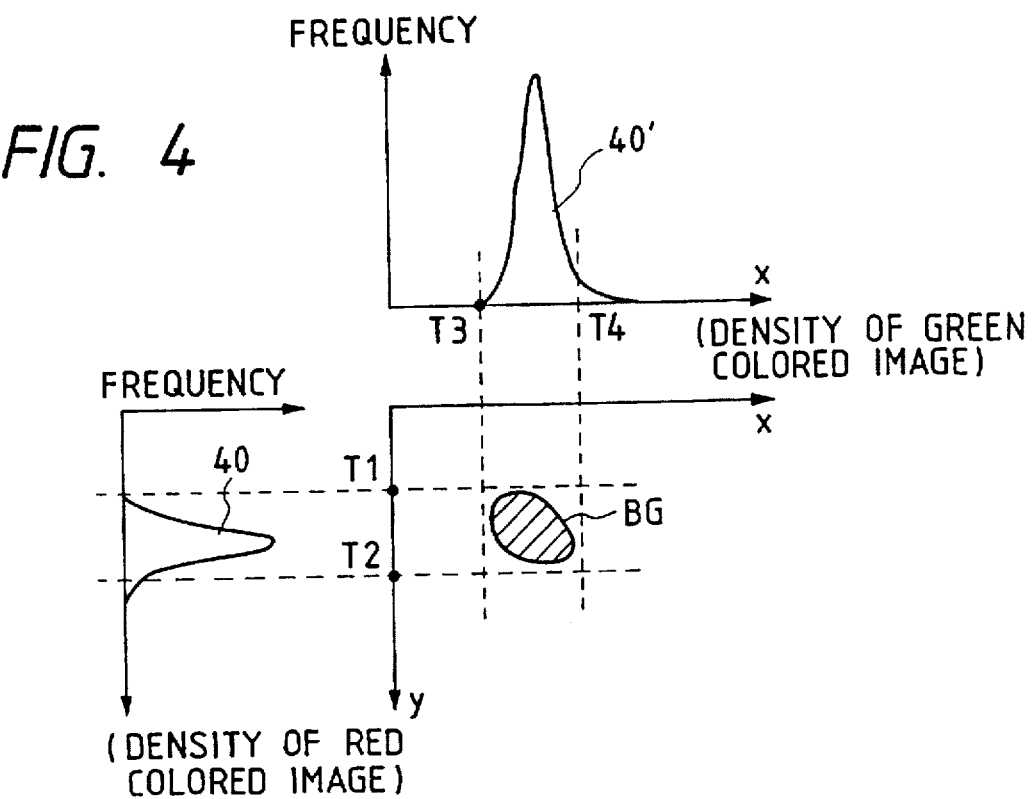
FIG. 4 is a schematic diagram showing the region segmentation that extracts the background region in the color space of this invention.

FIG. 4 schematically shows a region segmentation that extracts the background in a color space. An x-axis represents the density of greencolored image and a y-axis represents the density of red-colored image. Here, threshold values T1, T2 are determined from the density histogram 40 of redcolored image and threshold values T3, T4 from the density histogram 40' of green-colored image. (Although a method similar to the region segmentation of FIG. 4 is disclosed in Japan Patent Laid-Open No. 314338/1994, it does not make any correction of density irregularities caused by distortion of optical system mentioned earlier.)

To describe in more detail, a density histogram is produced for each image to determine a density value that has a peak value in the histogram and a density value that gives a half-value width. Next, based on these values, a background region needed to extract the object region is discriminated and picked up.

Then, the procedure for calculating threshold values, identifying the background and determining feature parameters of the object particle pattern is explained below.

(Procedure 1): A density histogram is generated for each image (green-colored image and red-colored image). The position of each pixel in the images is represented by (i,j), i.e., G(i,j) for pixel in green-colored image and R(i,j) for pixel in red-colored image.

Figure 5:
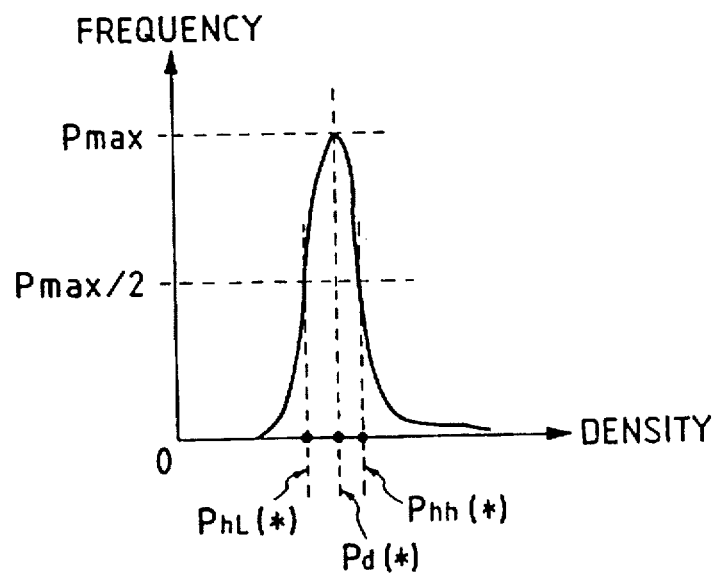
FIG. 5 is a diagram showing a density histogram to obtain parameters for use in determining a threshold.

(Procedure 2): In each density histogram, a density value $P_d(*)$ that has a maximum value $P_{max}(*)$ of frequency is determined as shown in FIG. 5.

(Procedure 3): In each density histogram, density values $P_{hL}(*)$, $P_{hh}(*)$ that give a half value of peak are determined. * represents either red or green.

(Procedure 4): By using the density values $P_d(*)$, $P_{hL}(*)$, $P_{hh}(*)$ determined by (Procedure 1) to (Procedure 3), the threshold values T1, T2, T3, T4 are calculated from the following equations (5) to (8). From the red-colored image, $$T1 = P_d(R) - \{P_d(R) - P_{hL}(R)\} \cdot \sigma \quad (5)$$

$$T2 = P_d(R) - \{P_d(R) - P_{hh}(R)\} \cdot \sigma \quad (6)$$

From green-colored image, $$T3 = P_{d(G)} - \{P_d(G) - P_{hL}(G)\} \cdot \sigma \quad (7)$$

$$T4 = P_d(G) - \{P_d(G) - P_d(G)\} \cdot \sigma \quad (8)$$

where $\sigma$ is a predetermined parameter that can be obtained experimentally and is normally set at 3.0–3.5.

(Procedure 5): Based on the threshold values T1–T4 calculated by (Procedure 1) to (Procedure 4), a binary image is generated in the image space according to Equation (9) shown below. The background region (BG) is obtained from $$\{T1 < R(i,j) < T2\} \cap \{T3 < G(i,j) < T4\} \quad (9)$$

where $\cap$ represents a logical AND.

(Procedure 6): The binary image generated by (Procedure 5) is modified and shaped.

(Procedure 7): Mutually independent regions other than the background region that was determined by (Procedure 5) are labeled as object regions where object particles exist.

(Procedure 8): For the labeled object regions, feature parameters are determined to discriminate the patterns of the object regions. Known feature parameters are determined by a known technique to identify the pattern of individual object regions. If a pattern corresponding to a pattern obtained from procedure 6 is generated from object patterns that were extracted for color tone discrimination according to the degree of staining of the object particles and to object particles positions and states (contact and overlapping conditions), it is possible to obtain a more stable object pattern.

The process of this embodiment may be summarized as follows.

(1) Gray level correction process: Density irregularities due to distortion of optical system are removed in the green-colored image and red-colored image.

(2) Region segmentation: By using the threshold values of the green-colored image and red-colored image, the images are divided between the background region and the object region and a binary image is produced with the background region represented by 0 and the object region represented by 1.

(3) Modifying process: The binary images are modified and shaped, as by swelling the object region and removing noise from the background region.

(4) Labeling: Labeling is done for each connected component in the binary image to label a plurality of objects in the image with numbers.

(5) Calculation of feature parameters: For each of the labeled objects, the feature parameters such as area, perimeter and average density are determined.

(6) Discrimination: Based on the feature parameters obtained, examinations and identifications are made for each of the objects.

The processes (3) to (6) can apply the conventional techniques including filter process such as swelling and shrinking process.

Application of this embodiment to 99 images produced from four real samples resulted in extraction of object particles through region segmentation in 93 images out of 99. The remaining six images in which the object particle extraction failed were those found to have non-stained object particles and poorly adjusted focus position.

Figure 6:
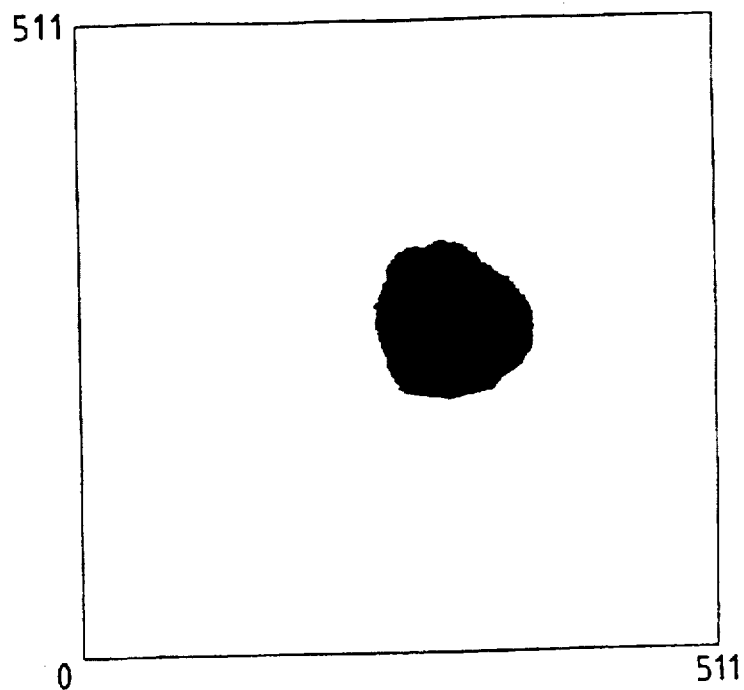
FIG. 6 and FIG. 7 are example results of the region segmentation, in the first embodiment, performed on a cell image in which object particles are well stained and on a cell image in which object particles are hardly stained.
Figure 7:
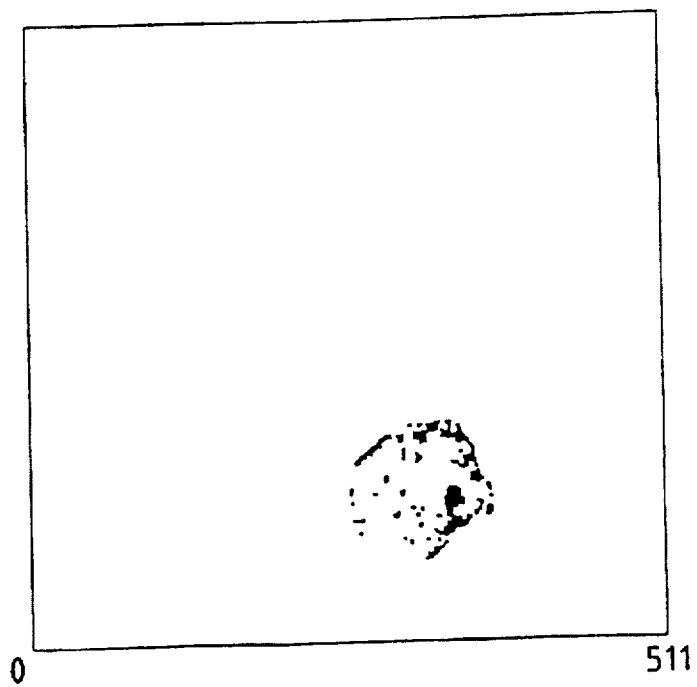

The results of application of this embodiment to the actual samples (with process (3) implemented) are shown in FIG. 6 and 7. In FIG. 6 and 7, the horizontal (x) axis and vertical (y) axis consists of 512 pixels, from 0th to 511th pixel. FIG. 6 shows an example result of region segmentation of an image having well-stained cells as object particles, and FIG. 7 shows another example result of region segmentation of an image having hardly stained cells. According to this embodiment, when the object particle is not sufficiently stained as shown in FIG. 7, the object particle may not be completely extracted irrespective of the cytoplasm density and background density. Such poorly stained particles can be extracted by the following methods described in the second, third and fourth embodiment.

(Embodiment 2)

In the following, cells (particles) hardly stained by dye are called non-stained cells (particles) and those well stained are called stained cells (particles) for simplicity. Those cells (particles) stained lightly but only poorly are also called non-stained cells (particles).

When the object particles are well stained by dye, a good region segmentation can be performed according to the method of the first embodiment. Cells with high activity have a bad stain characteristic and in some cases may hardly be stained (non-stained cells). It is found that such non-stained cells exist in urine specimens highly frequently. There are also particles in the urine specimen that are not sufficiently stained.

An image including a non-stained cell has nearly equal color tones in the object region and the background region, and the object region includes many parts having densities almost equal to or lower than that of the background region. When a non-stained cell exists in the image, the region segmentation method of the first embodiment can only extract the object region to the extent shown in FIG. 7, in which the region where the cell exists is not fully filled with pixels having the same density values. When a correct binary image is not obtained, as shown in FIG. 7, it is not possible to determine the characteristic parameters of the object region correctly and there is a high possibility that the identification of the object may fail. To improve the discriminating rate of the sediment components, a method is needed which can correctly discriminate objects such as cells and particles that can hardly be stained.

Non-stained cells (cells hardly stained by dye) are almost transparent, and the region where the cell exist (object region) has nearly the same color tone as the background region and contains many areas whose densities are almost equal to that of the background region. First, let us explain about the difference between an image including a non-stained cell and an image including a stained cell.

Figure 8A:
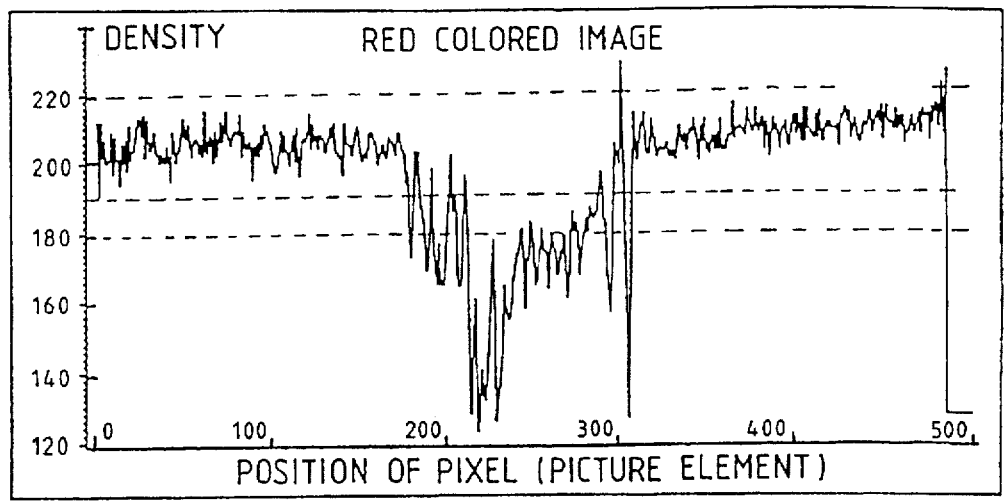
Figure 8B:
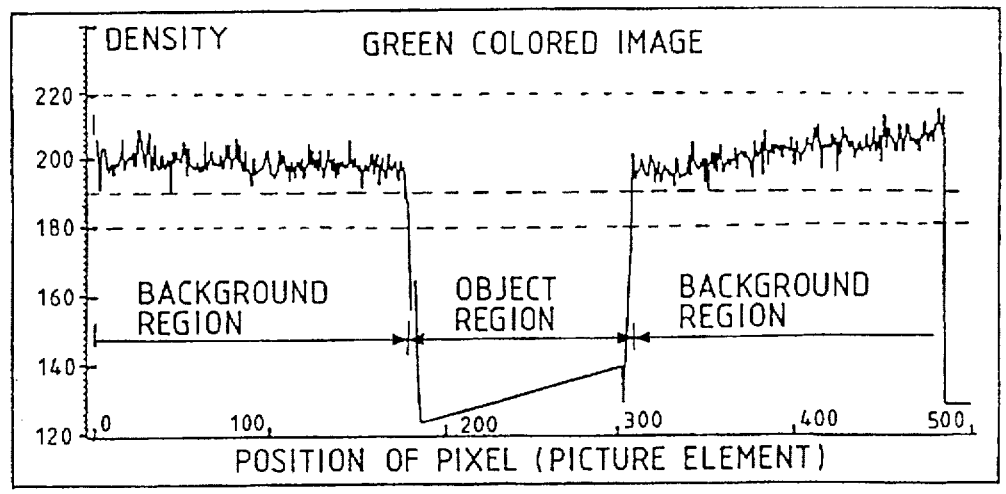
Figure 8C:
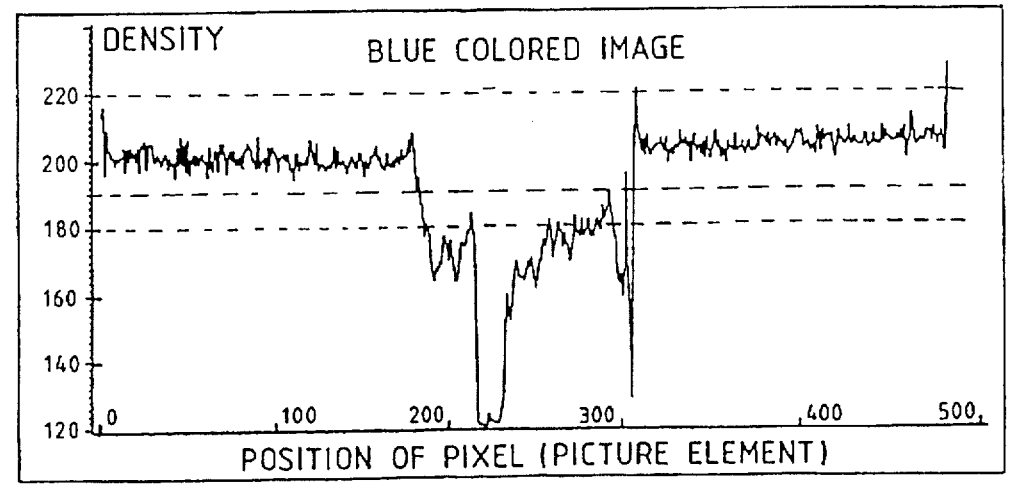

FIG. 8 and 9 show example densities of images including a stained cell and a non-stained cell. In FIGS. 8 through 13, the abscissa represents the positions of 512 pixels, from 0th to 511th pixel in the y direction of the image.

In an image-including a stained cell (cell that is well stained), FIG. 8 shows a plotted density along a line (x=300) in the y direction passing through a region of the image that contains the stained cell. In an image including a non-stained cell, FIG. 9 shows a plotted density along a line (x=340) in the y direction passing through a region of the image that contains the non-stained cell.

In FIG. 8 and 9, the abscissa represents a position in the image (y coordinate) and the ordinate represents a density. The closer the density is to 0, the darker the color; and the closer the density is to 255, the lighter the color. FIG. 8 shows that the green-colored image has its density sharply reduced in the region of the stained cell from the background region. In this case, if the density is set with a threshold value of, say, 180 or 220, it is understood that the green-colored image allows the object region and the background region to be clearly divided. (In FIG. 8 the threshold value of 190 is also shown for reference.) Comparison between FIG. 9 and an actual image (not shown) has found that a cell exists in a portion whose density change is larger (at a location near y=400) than the surrounding. FIG. 9 indicates that in the region (object region) of the non-stained cell there are many parts whose densities are higher and lower than that of the background region and also many parts whose densities are almost equal to that of the background region. It is therefore seen that simply setting in FIG. 9 the same threshold value as used in FIG. 8 does not ensure correct extraction of the object region. (In FIG. 9, the same thresholds as used in FIG. 8 are shown.)

It is further seen from FIG. 9 that the image containing a non-stained cell has large density variations in the non-stained cell region (object region) while the density variation is small in the background region.

Utilizing the variations in density, this embodiment calculates the magnitude of density change in the image, provides threshold values to the density and to the magnitude of density change, and performs region segmentation to precisely extract the region in the image that contains the non-stained cell (the cell hardly stained by dye).

As an index representing the magnitude of density change, let us consider a variance of density in a localized area. Suppose the density at a point (x,y) on the image is P(x,y) and that a localized variance of density is q(x,y). q(x,y) is defined as follows.

$$q(x, y) = \left\{ \frac{1}{(2n+1)^2} \right\} \sum_{i=x-n}^{i=x+n} \sum_{j=y-n}^{j=y+n} \{P(i,j)\}^2 - \left\{ \frac{1}{(2n+1)^4} \right\} \left\{ \sum_{i=x-n}^{i=x+n} \sum_{j=y-n}^{j=y+n} P(i,j) \right\}^2 \quad (10)$$

Figure 10A:
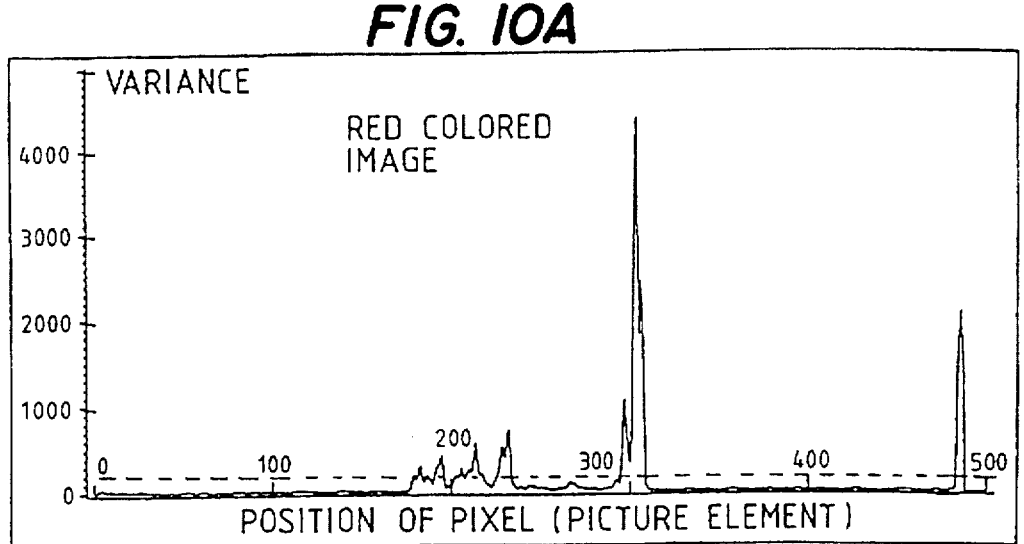
Figure 10B:
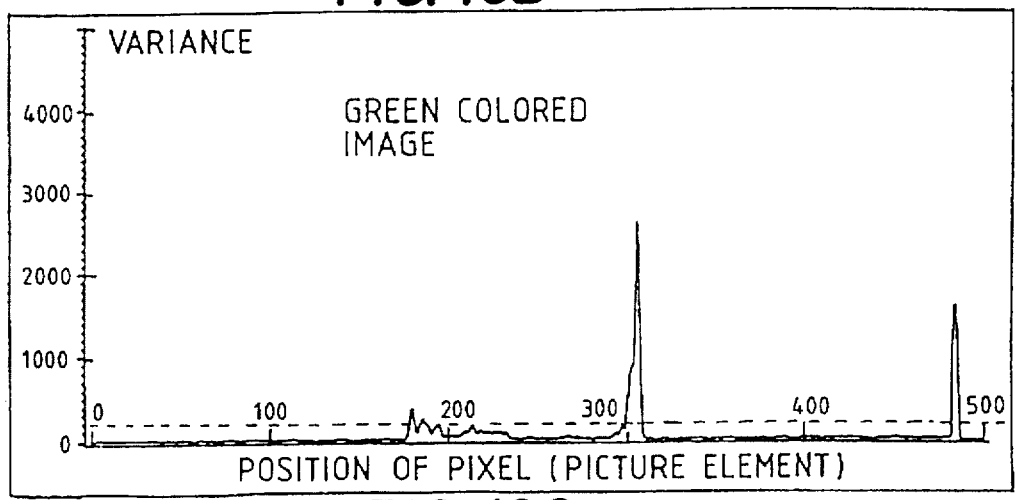
Figure 10C:
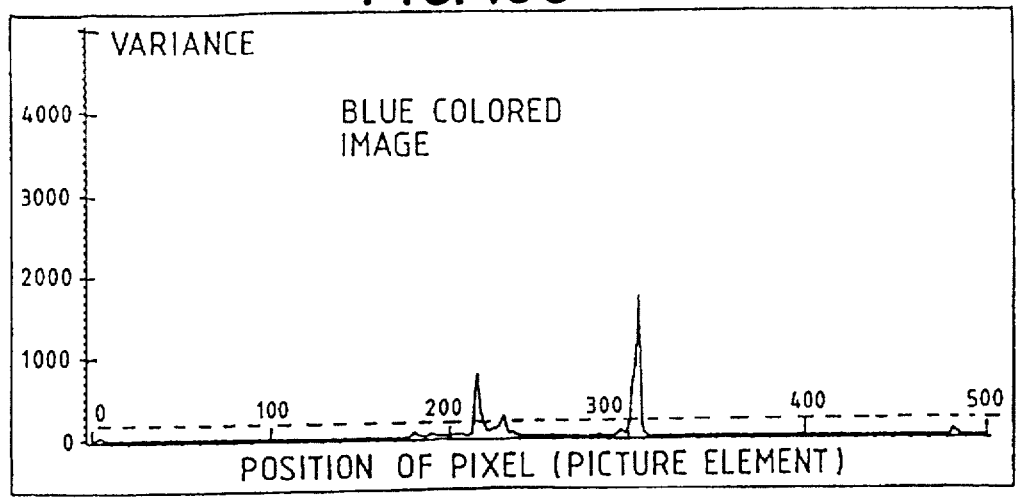

FIG. 10 and 11 show example variances of density in images that include a stained cell and a non-stained cell, respectively (an example of q(x,y) when n-2). FIG. 10 and 11 show variance q(x,y) plotted for the same position (1 line) as in FIG. 8 and 9, respectively. Abscissa represents a y coordinate of the image and ordinate represents a variance calculated from Equation (10). In FIG. 10 and 11, the large peak near y=490 on abscissa is caused by a non-continuous component at the end of the image and not related with the object to be identified (cell) in the image. FIG. 11 shows variance q(x,y) of an image containing a non-stained cell. Comparison with FIG. 8 shows that the variance of the background region is close to zero and the variance of the object region is high. Hence, to extract the object region containing a non-stained cell, the region segmentation is performed by setting a threshold $q_{th}$ for variance and taking a region having greater variance than $q_{th}$ as the object region. FIG. 11 shows an example with the threshold value $q_{th}$ set at 200.

FIG. 10 shows the variance q(x,y) of an image containing a stained cell. Compared with FIG. 8, a large variance is found at an edge portion of the object region (near y=200 and y=300 on abscissa). Because the interior of the cell is stained in uniform color tone, variance is small, so that performing the region segmentation by setting a variance threshold will result in only the edge portion of the cell being extracted as the object region (FIG. 10 shows an example with the threshold $q_{th}$ set at 200 as in FIG. 11). To solve this problem, the threshold is set not only in the variance but also in the density in performing the region segmentation and the results of both region segmentation are superimposed to correctly extract the object region for a stained cell and the object region for a non-stained cell.

The method described above uses a localized variance of density defined by Equation (10) to detect the magnitude of density variation in an image. To simplify the construction of the apparatus and to allow easier detection of the magnitude of density variance, a difference in density defined by Equation (11) shown below is used. Let the density at point (x,y) be P(x,y) and the density difference be r(x,y).

$$r(x, y) = \sum_{i=1}^{i=n} P(x, y+i) - \sum_{i=1}^{i=n} P(x, y-i) \quad (11)$$

Because Equation (11) can be calculated by using only addition and subtraction and because the density values used to calculate a difference value at a point in the image are the density values of pixels arranged one-dimensionally on the image, it is possible to perform high-speed processing with a simple configuration of the apparatus in synchronism with the transfer of image signals.

Figure 12A:
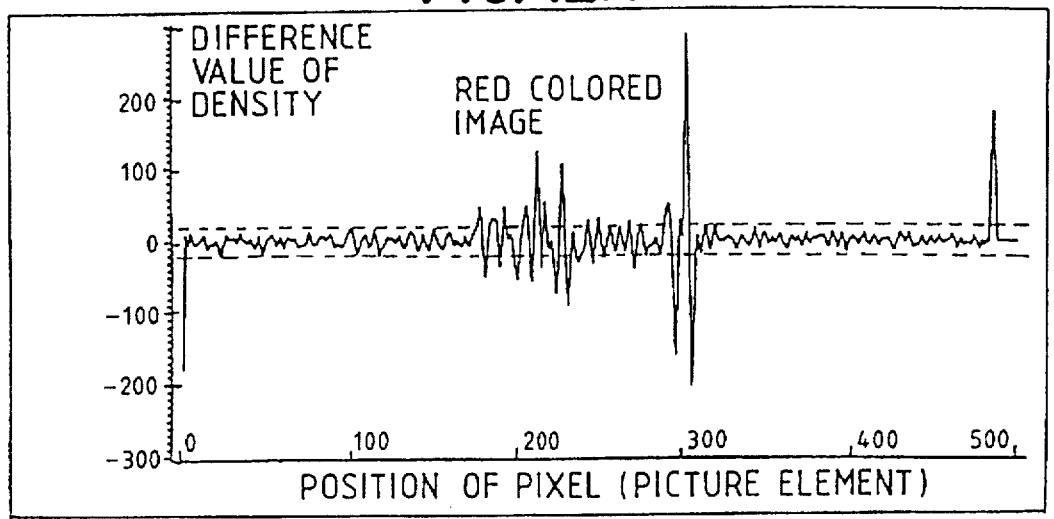
FIG. 12 and FIG. 13 are example graphs showing density differences of images containing well stained cells and of images containing hardly stained cells in the second embodiment of this invention.
Figure 12B:
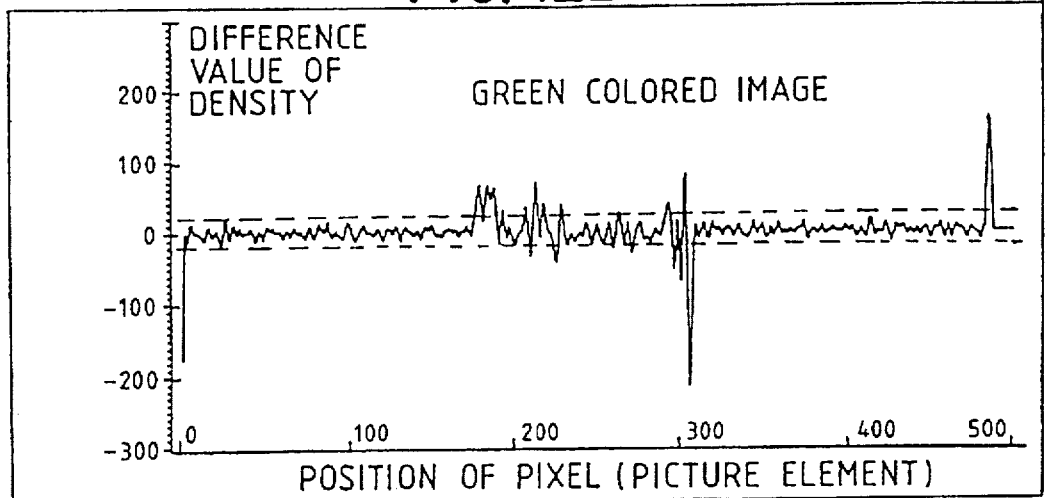
Figure 12C:
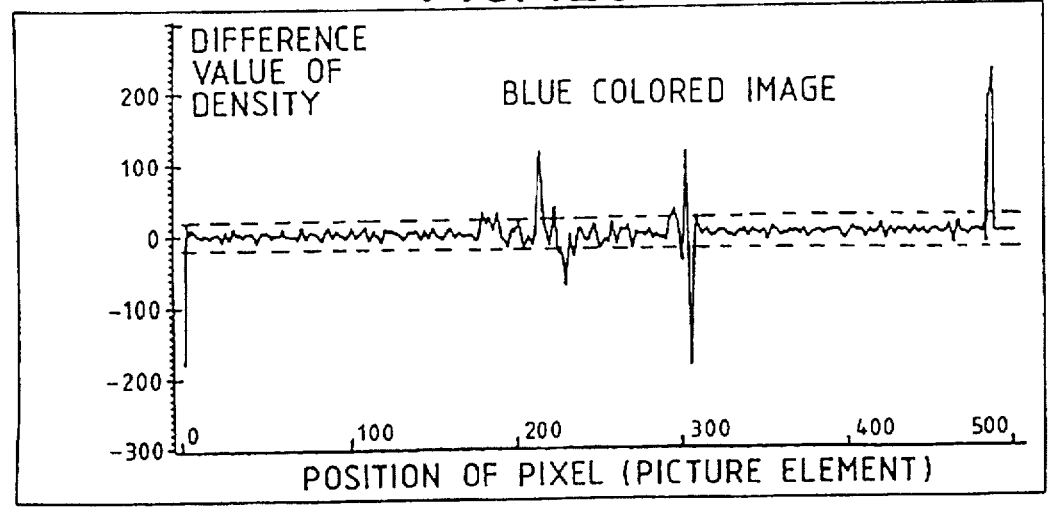
Figure 13A:
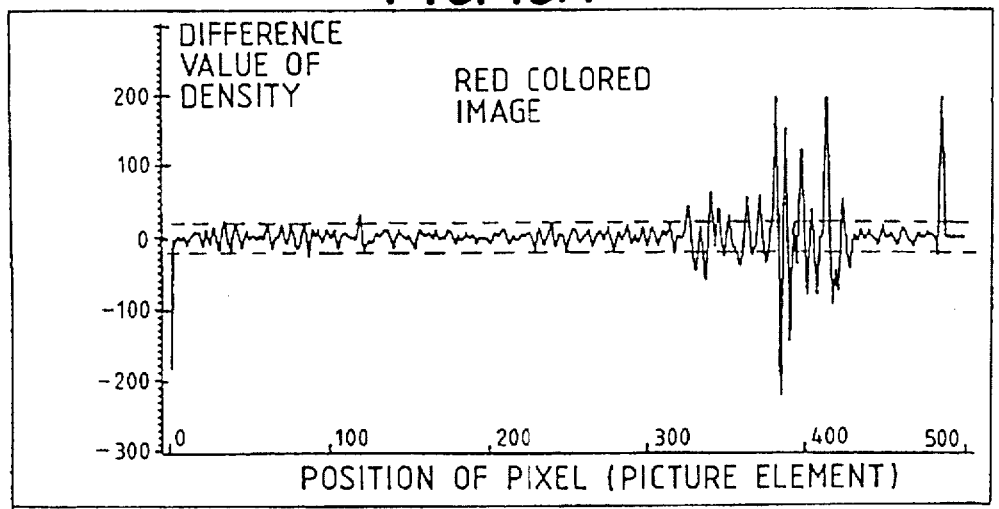
Figure 13B:
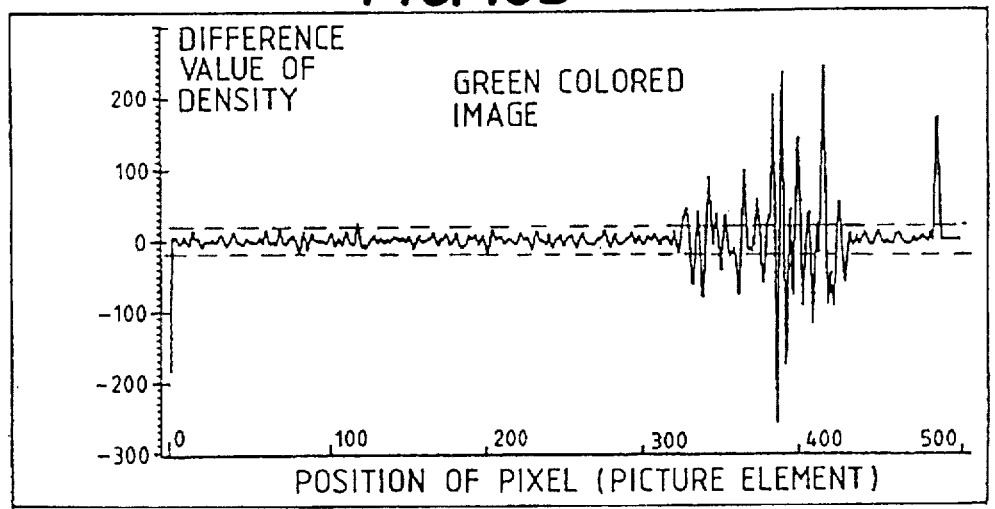
Figure 13C:
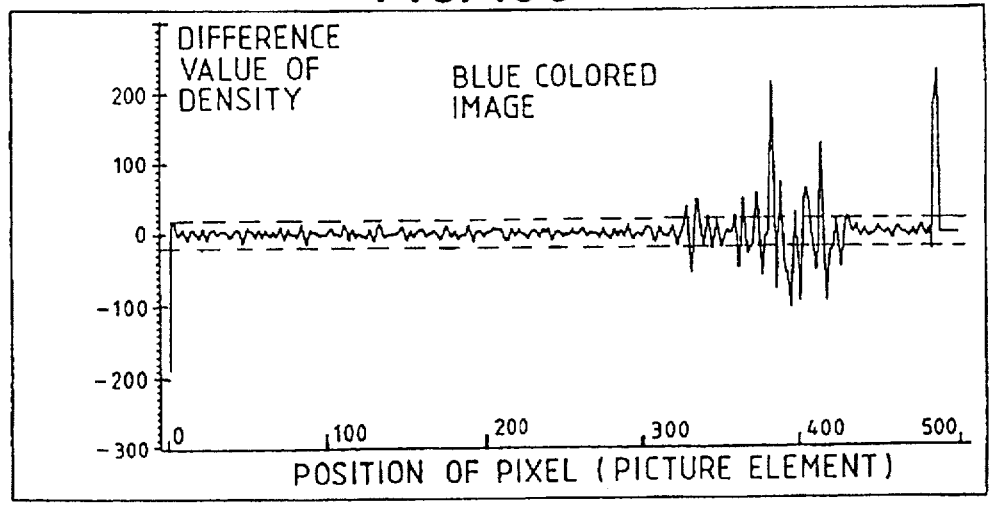

FIG. 12 and 13 show examples of density difference (when n=2) in images containing a stained cell and a non-stained cell, respectively. FIG. 12 and 13 plot density difference values for the same positions (one line) as in FIG. 8 and FIG. 9, respectively. As with the variance, the peak of density difference near 490 on abscissa is produced by a non-continuous portion at the end of the image.

FIG. 12 shows the density difference of an image containing a stained cell. Compared with FIG. 8, the density difference greatly varies to positive and negative at the edge of the object region and, in the object region and in the background region, the density difference is close to zero.

FIG. 13 shows the density difference of an image containing a non-stained cell. Comparison with FIG. 9 shows that the density difference assumes a value close to zero in the background region and greatly changes to positive and negative in the object region where the cell exist.

It is noted, however, that there are many parts having density difference close to zero even within the object region. Therefore, if the region segmentation is performed by setting two positive and negative threshold values for the density difference $r_{th1}$, $r_{th2}$ ($r_{th1} < 0 < r_{th2}$) and taking a region $r_{th1} < r(x,y) < r_{th2}$ as the background, the areas whose density difference is close to zero are treated as the background region. Further, if this method is applied to an image containing a stained cell, only the edge portion of the cell is taken as the object region. FIG. 12 and 13 show the case of threshold value $r_{th1}$ set to −20 and $r_{th2}$ to 20.

Here, let us consider the relation between the density and the density difference. A point whose density difference is 0 is where the density assumes a local maximum or local minimum value. The density at such a point is very likely to assume a value relatively larger or smaller than the density value averaged over the background region. That is, for areas that cannot be correctly region-segmented based on the threshold value of the density difference (areas inside the object region that are wrongly recognized as the background region), the region segmentation is performed by setting a threshold value also for the density to enable correct extraction of such areas as the object region. It is therefore possible to perform region segmentation correctly both on an image containing a non-stained cell and an image containing a stained cell by setting threshold values both for the density difference and for the density and superimposing the results of two region segmentation based on the two threshold values (i.e., taking logical OR).

This method is explained by referring to the result obtained when it was applied to images generated by the flow method. Examination of 51 cases of images containing squamous epithelial cells that are very difficult to be stained found eight images to have non-stained particles. The application of this method to these eight images, which have non-stained particles and were difficult to be correctly regionsegmented with the method of the first embodiment, produced the similar result to that of the image containing stained particles. In the following, we will describe a typical case of an image containing a stained particle and a case of an image containing a non-stained particle.

Figure 14:
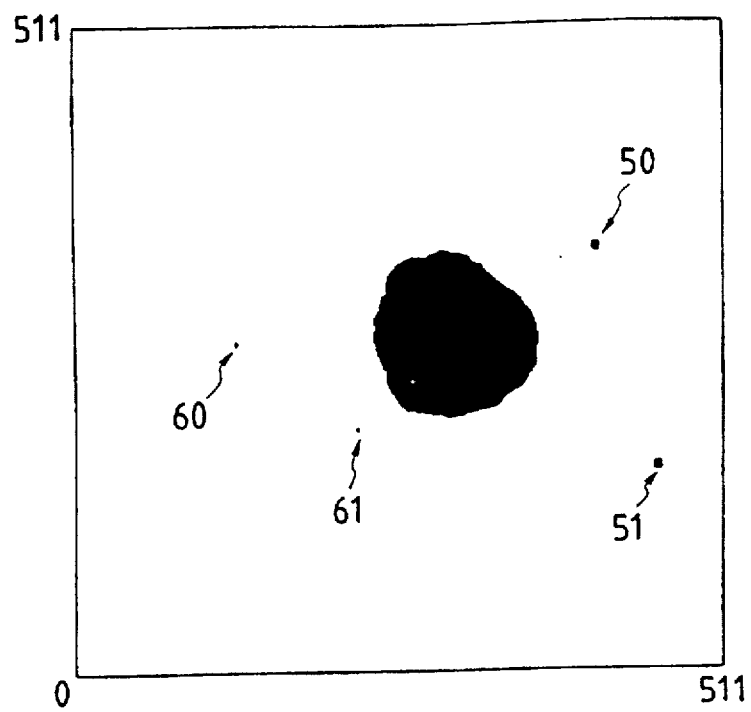
FIG. 14 and FIG. 15 are example results of the region segmentation, in the second embodiment, performed on a cell image containing well stained cells and on a cell image containing hardly stained cells, the region segmentation employing a method based on binarization using localized variance of density.
Figure 15:
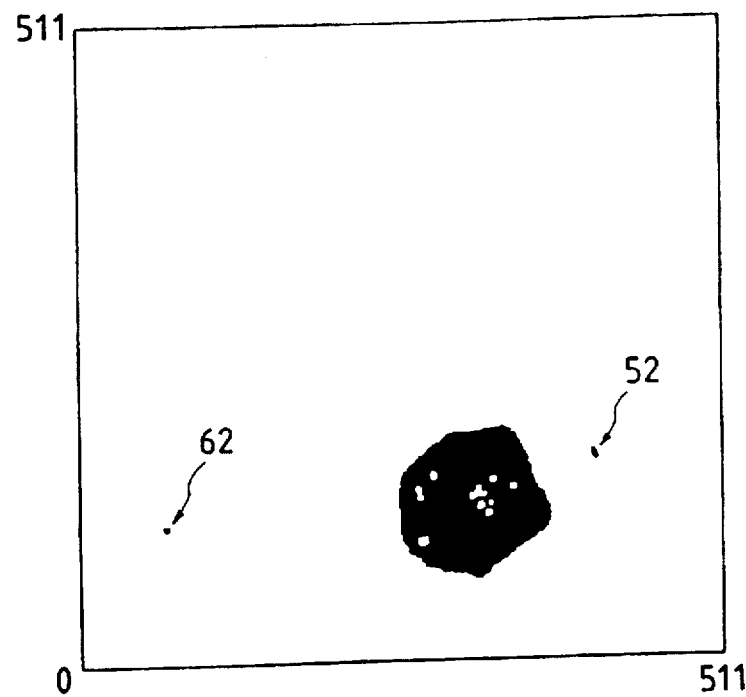

FIG. 14 and 15 show the results of region segmentation performed on an image containing a stained cell and an image containing a non-stained cell by means of a method that uses binarization based on localized variance of density (i.e., region-segmented binary images that have undergone the modifying processes).

In FIG. 14 to FIG. 17, the horizontal (x) axis and vertical (y) axis each consist of 512 pixels, from 0th to 511th pixel.

The process of region segmentation used the density value of green-colored image and the variance that was calculated from Equation (10) by using the density value of green-colored image and n=2. That is, let the density at a point (x,y) be P(x,y), the variance be q(x,y) and the result of binarization be s(x,y). Then, $s(x, y) = 0$ (background: white)     (12)
when $P_{th1} < P(x, y) < P_{th2}$ and $q(x, y), q_{th}$;
$s(x, y) = 1$ (object area: black)
when other than the above After determining the binary image represented by s(x,y), the modifying processes (background region noise eliminating process and object region swell process) were carried out, that is, performing the swelling process once and the shrinking process two times on the object region, followed by one swelling process. (These processes are known techniques.)

The threshold values $P_{th1}$, $P_{th2}$ of density were set as follows by determining a density $P_m$ that gives the maximum value in the density histogram and densities $P_{s2}$, $P_{s2}$ ($P_{s1} < P_m < P_{s2}$) that give one-half the maximum value.

$P_{th1} = P_m - 3.5(P_m - P_{s1})$
$P_{th2} = P_m + 3.5(P_{s2} - P_m)$     (13)

The threshold of variance is set at $q_{th} = 30$.

FIG. 15 clearly shows that the result of region segmentation performed on the image having a non-stained cell is greatly improved over the result of Embodiment 1 shown in FIG. 7.

In the image having a stained cell (FIG. 14), germs were found at two locations (50, 51) to the right of the object region; and in the image having a non-stained cell (FIG. 15), they were found at one location (52) to the right of the object region. These germs were not able to be detected from the result of the method of Embodiment 1 (FIG. 6 and 7). There are spots at two locations (60, 61) in the image of FIG. 14 on the left side of the object region containing the stained cell and also a spot at one location (62) in the image of FIG. 15 on the left side of the object region containing the non-stained cell. These spots are smaller than the germs and considered noise components of the background region..

Figure 16:
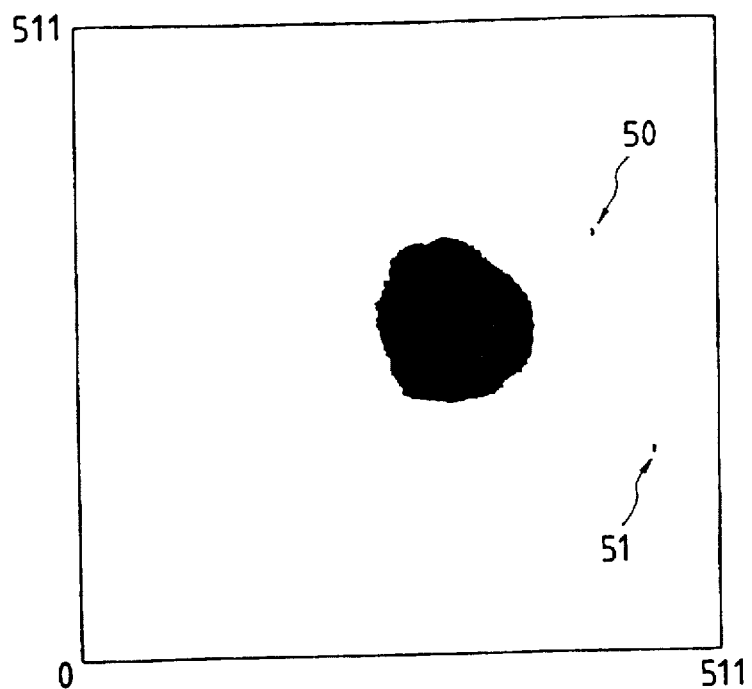
FIG. 16 and FIG. 17 are example results of the region segmentation, in the second embodiment, performed on a cell image containing well stained cells and on a cell image containing hardly stained cells, the region segmentation employing a method based on binarization using difference of density.
Figure 17:
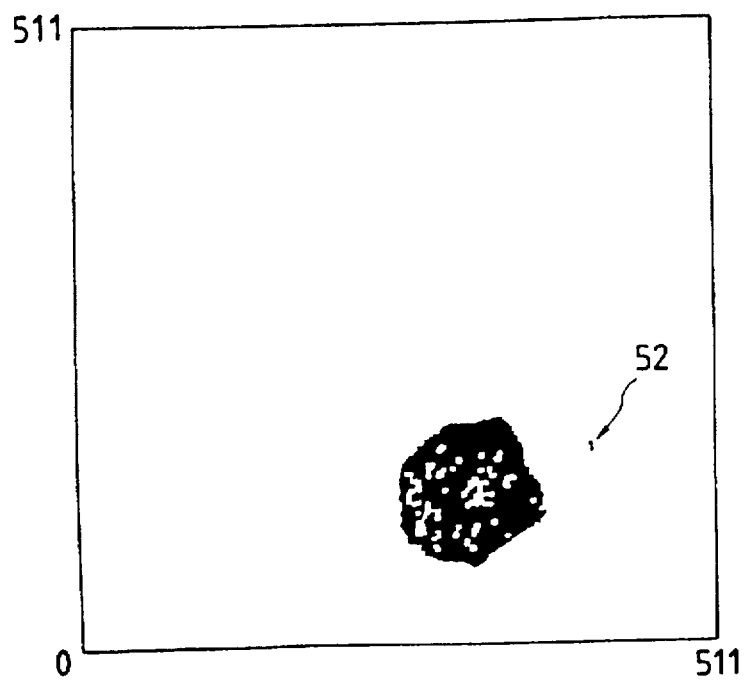

FIG. 16 and 17 show the results of region segmentation performed on an image containing a stained cell and an image containing a non-stained cell by means of a method that uses binarization based on density difference (i.e., region-segmented binary images that have undergone the modifying processes). The process of region segmentation used the density value of green-colored image and the density difference that was calculated from Equation (11) by using the density value of green-colored image and n=2. That is, let the density at a point (x,y) be P(x,y), the density difference be r(x,y) and the result of binarization be s(x,y). Then, $s(x, y) = 0$ (background: white)     (14)
when $P_{th1} < P(x, y) < P_{th2}$ and $r_{th1} < r(x, y) < r_{th2}$;
$s(x, y) = 1$ (object area: black)
when other than the above After determining the binary image represented by s(x,y), the modifying processes were carried out. The modifying processes and the setting of thresholds $P_{th1}$, $P_{th2}$ were done in the same way as in the region segmentation that uses binarization based on localized variance of density. The thresholds for the difference value $|r_{th1}|$, $|r_{th2}|$, need be set in a range of 15–25. They were set at $r_{th1} = -20$ and $r_{th2} = 20$.

FIG. 17 clearly shows that the result of region segmentation performed on the image having a non-stained cell is greatly improved over the result of Embodiment 1 shown in FIG. 7.

In the image having a stained cell (FIG. 16), germs were found at two locations (50, 51) to the right of the object region; and in the image having a non-stained cell (FIG. 17), they were found at one location (52) to the right of the object region. These germs were not able to be detected from the result of the method of Embodiment 1 (FIG. 6 and 7).

Comparison of FIG. 7, 15 and 17 indicates that the above two kinds of region segmentation method that use binarization based on localized variance of density and density difference are more effective than the method of Embodiment 1 in extracting the region of a non-stained cell. Of the two methods, the one using the localized variance of density is more effective in the extraction of the non-stained cell region. The method using the difference of density, however, allows the apparatus to be formed in a simpler configuration. In the following the region segmentation method using density difference will be described in detail.

FIG. 16 and 17 show the results obtained by substituting n=2 in Equation (11) that determines the density difference. The number of neighboring pixels used in calculating the density difference of a certain pixel is expressed as 2n+1. This number is called a mask size. For example, when n=2, the determination of the density difference for a pixel requires two pixels on each side of the pixel in question in the y direction, i.e., a total of five pixels. This means that the pixel has a mask size 5. When the mask size =1, it means that no difference process is performed.

Figure 18:
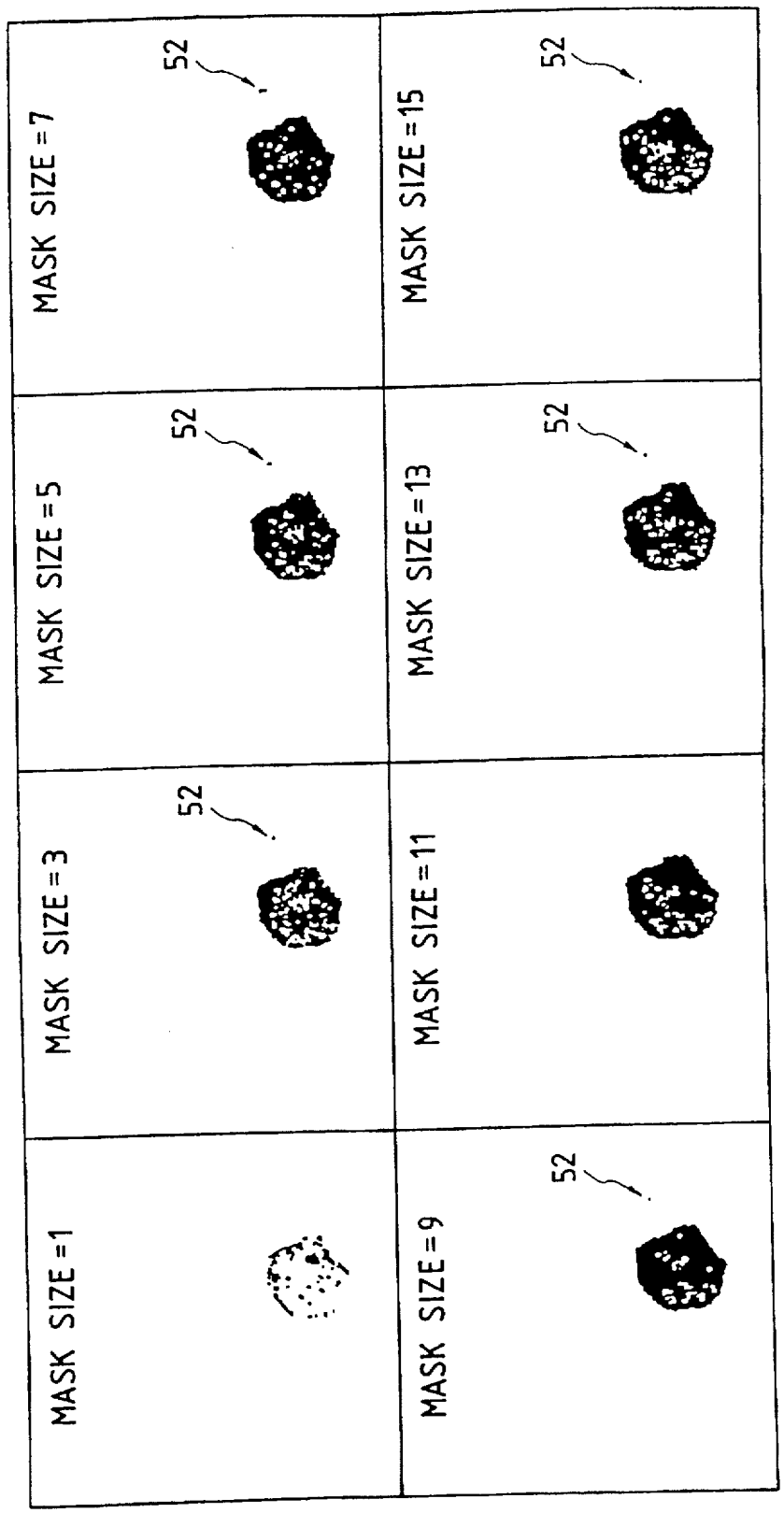
FIG. 18 is example results of region segmentation with mask size changed in the second embodiment of this invention.

FIG. 18 shows results of region segmentation with different mask sizes. Images shown in FIG. 18 each consist of 512×512 pixels. To examine the effects the mask size has on the region segmentation, the value of n was changed in the region segmentation. Examples shown in FIG. 18 are results of region segmentation performed on the images each containing the same non-stained cell as shown in FIG. 7, 15 and 17. The result shown in FIG. 8 for the mask size =5 corresponds to the result shown in FIG. 17. In FIG. 18, the result with the mask size =9 represents the best region segmentation (however, it has white areas within the object region that were wrongly identified as the background).

As in the results of FIG. 15 and 17, FIG. 18 also reveals a cell 52. The result for the mask size =1 that did not perform the difference process is similar to the result of Embodiment 1 shown in FIG. 7.

Next, the effects of the mask size are examined in terms of frequency axis.

Figure 19:
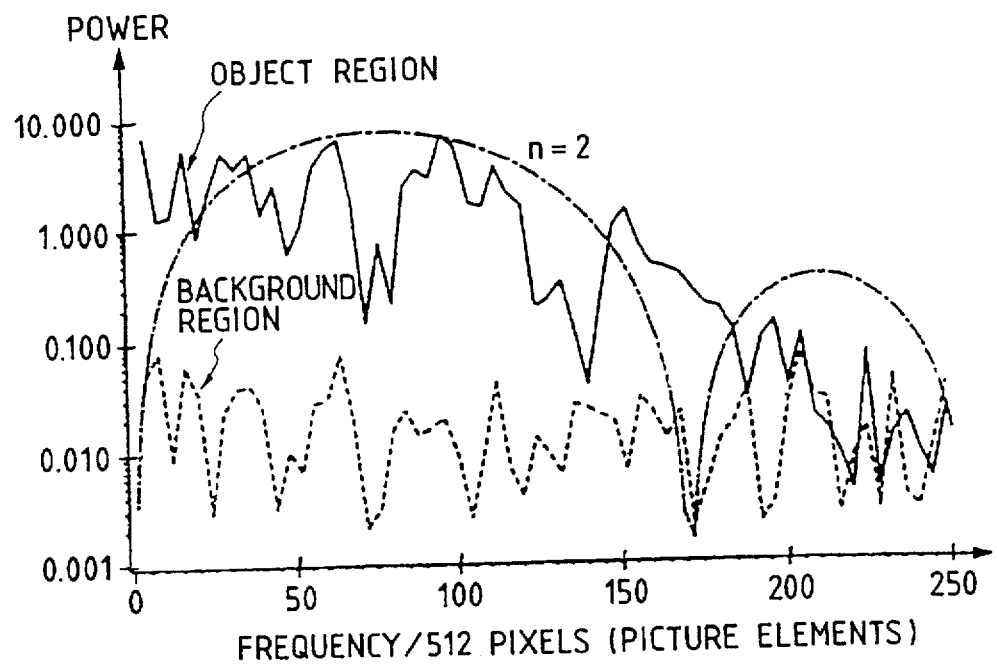
FIG. 19 is an example result of discrete Fourier transformation of a background region and an object region on one scan line in the second embodiment of this invention.

In FIG. 19, a dotted line represents the result of discrete Fourier transformation performed on a green-colored image signal component (density value) on a line (512 pixels) passing through the background region in the y direction, and a solid line represents the result of discrete Fourier transformation performed on a green-colored image signal component (density value) on a line (512 pixels) passing through the object region of a non-stained cell in the y direction. The abscissa represents a space frequency with one side of the image (512 pixels) taken as a unit length, and the ordinate represents a signal power with the maximum density value normalized to 0.1.

FIG. 19 indicates that the signals representing the background region, which are noise components, are distributed over nearly the entire region with a uniform power except for DC components and that the image signals of the line passing through the object region of a non-stained cell have greater power in the frequency range of 1–150 than the signals of the background region.

If Equation (11) used to emphasize the object region of a non-stained cell is deemed as a digital filter, the transfer function is expressed as follows by using z-transform.

$$H(z) = \sum_{k=1}^{k=n} \{z\uparrow(k) - z\uparrow(-k)\} \quad (15)$$

where $z\uparrow(y)$ represents the (y-th) power of z (y=k, y=–k). The frequency response at this time is given by $$H(\Omega) = 2j \frac{\sin\left\{\frac{(n+1)\Omega}{2}\right\} \sin\left\{\frac{n\Omega}{2}\right\}}{\sin\left\{\frac{\Omega}{2}\right\}} \quad (16)$$

where $\Omega$ represents a space frequency with two pixels on the image taken as a unit length and j represents an imaginary unit.

Figure 20:
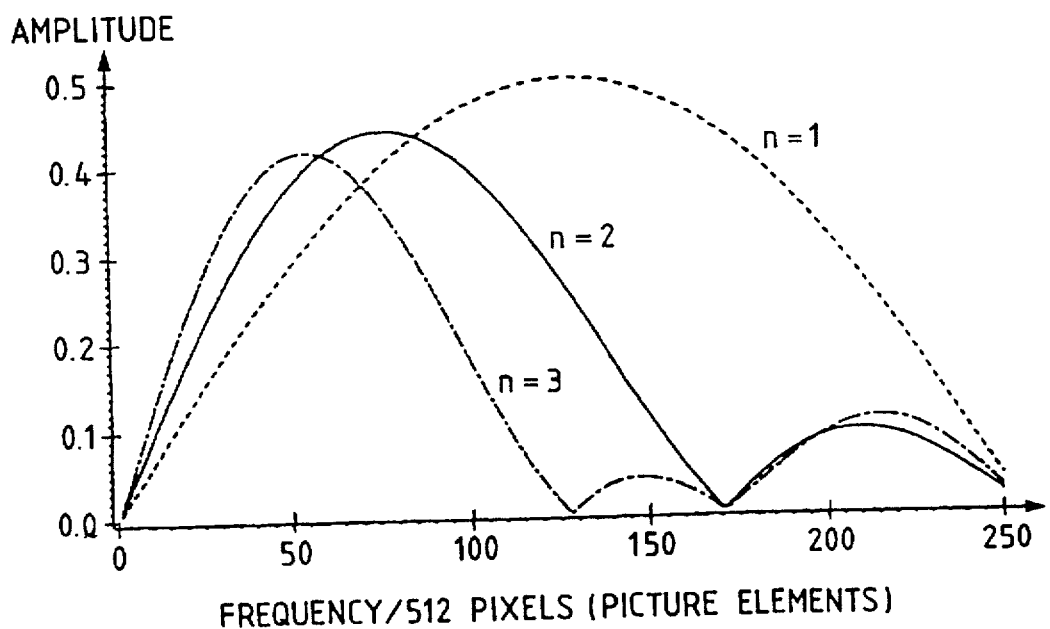
FIG. 20 is an example frequency-amplitude characteristic of filter (|H($\Omega$)|) in the second embodiment of this invention.

FIG. 20 shows a frequency-amplitude characteristic (|H($\Omega$)|) for n=1, 2, 3.

In FIG. 20, abscissa represents a space frequency with one side of the image (512 pixels) taken as a unit length and ordinate represents the filter response normalized by using a mask size. The phase characteristic is constant at $\pi/2$. This filter has a function of emphasizing a frequency component unique to the image containing a non-stained cell and separating the emphasized frequency component from the background and also a function of shifting the phase by 90 degrees to shift from each other a portion that assumes a value of 0 when binarized by using the density and a portion that assumes 0 when binarized by using density difference.

From FIG. 20 it is seen that when n=2 (mask size 5) and n=3 (mask size 7), the signal component in the medium to low frequency zone unique to the image containing a non-stained cell is intensified but that as the mask size is increased to, say, n=5, the low frequency zone of the signal component peculiar to the image containing the non-stained cell is mitigated, though not shown. For this reason, the appropriate value of n is around 2–4 (mask size 5–9).

Figure 21A:
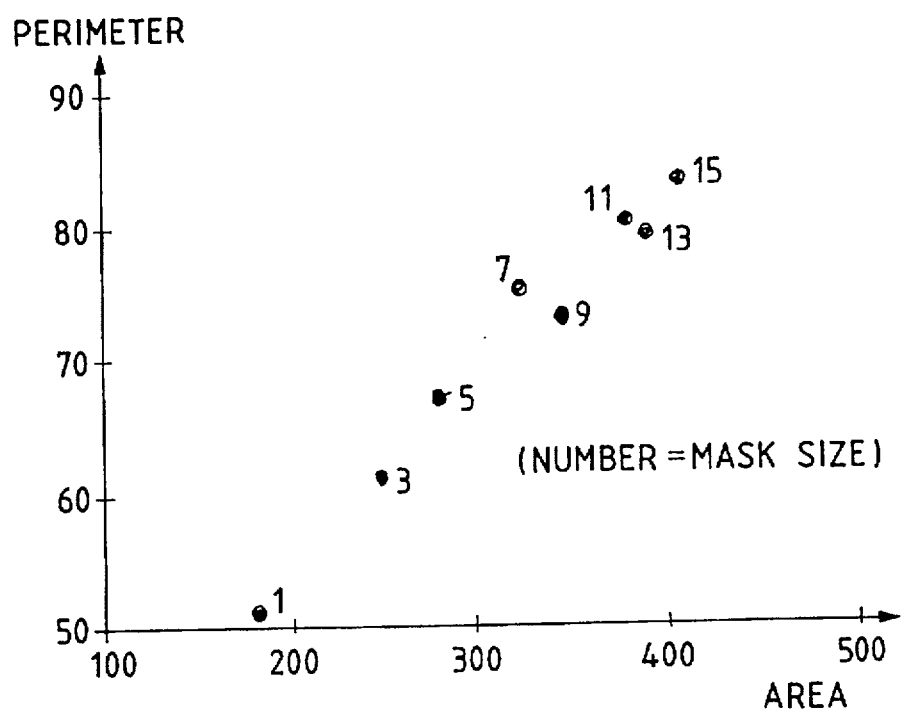
FIG. 21A and 21B are example results of investigation into effects that the mask size has on the geometry of the segmented regions in the second embodiment of this invention, the investigation being conducted by using red corpuscles.
Figure 21B:
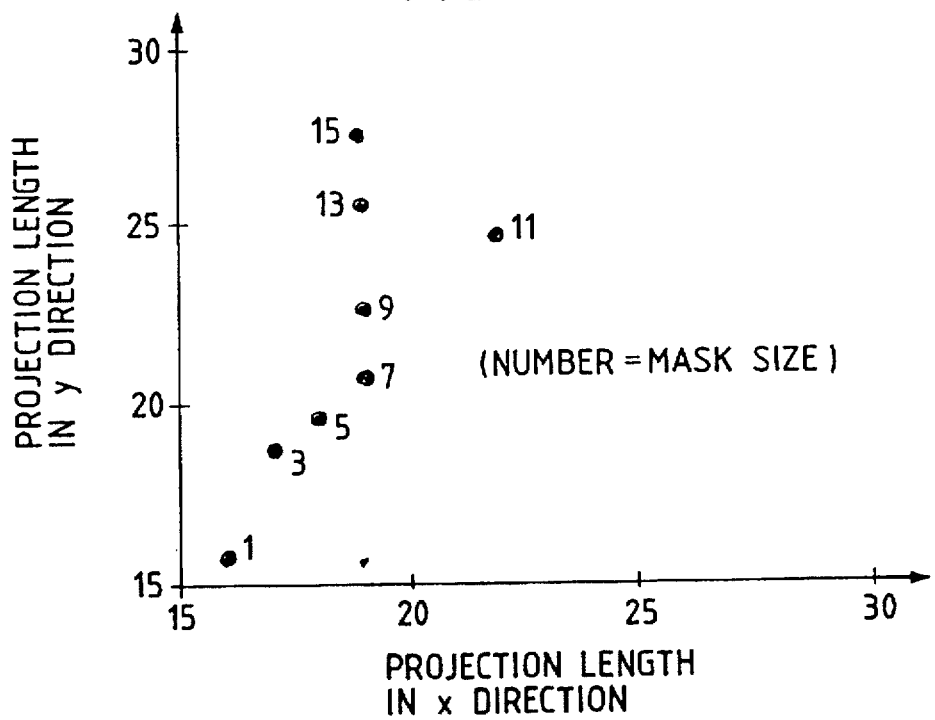

FIG. 21A and 21B show the results of investigation into the effects that the mask size has on the shape of a region extracted as an object region from an image of a stained blood cell. In these figures, the unit of length is the number of pixels.

Of the objects to be identified, the red blood cell is the second smallest next to germs and its shape is almost circular, so that the image of the red blood cell is region-segmented by changing the mask size to extract an object region and the change in the shape of the extracted object regions is evaluated to check for deterioration that occurs during the image processing (difference between the true shape of an object particle and the shape of the object region extracted through region segmentation).

FIG. 21A represents the areas and perimeters of an object region (red blood cell) when a variety of mask sizes (shown in the diagram as numbers) are used. As the mask size increases, the area and perimeter also increase, expanding the object region.

FIG. 21B represents the projection lengths in the x and y directions of a region-segmented red blood cell that is projected onto x- and y-axis. Because the red blood cell is almost circular, when the difference process is not performed (mask size =1), its projection lengths on the x- and y-axis are almost equal. When, however, the difference process is performed, the projection length in the y-axis direction, which is the direction of the difference process, is larger than the x-axis projection length, making the object region vertically oblong. As can be seen from FIG. 20, this is because the difference process suppresses the high frequency components and expands the edge of the object, which causes the object region to extend in the direction of the difference process.

This tendency becomes salient as the mask size increases. Hence, the mask size should be determined considering two factors—improvement of segmentation of an image containing a non-stained cell and degradation of segmentation of an image containing a stained cell.

The improvement of a binarized image having a non-stained cell permits calculation of precise feature parameters and leads to an improved discriminating rate in the pattern recognition performed at a later stage. On the other hand, the degradation of a binarized image having a stained cell makes the feature parameters incorrect and adversely affects the discriminating rate for small-size objects in particular. The binary image obtained changes according to the threshold used in binarization. Generally, the smaller the absolute value of a threshold, the better the region segmentation is performed on an image containing a non-stained cell but the more likely it is to pick up noise components in the background region. This fact must be heeded in determining an optimum threshold value.

Figure 22:
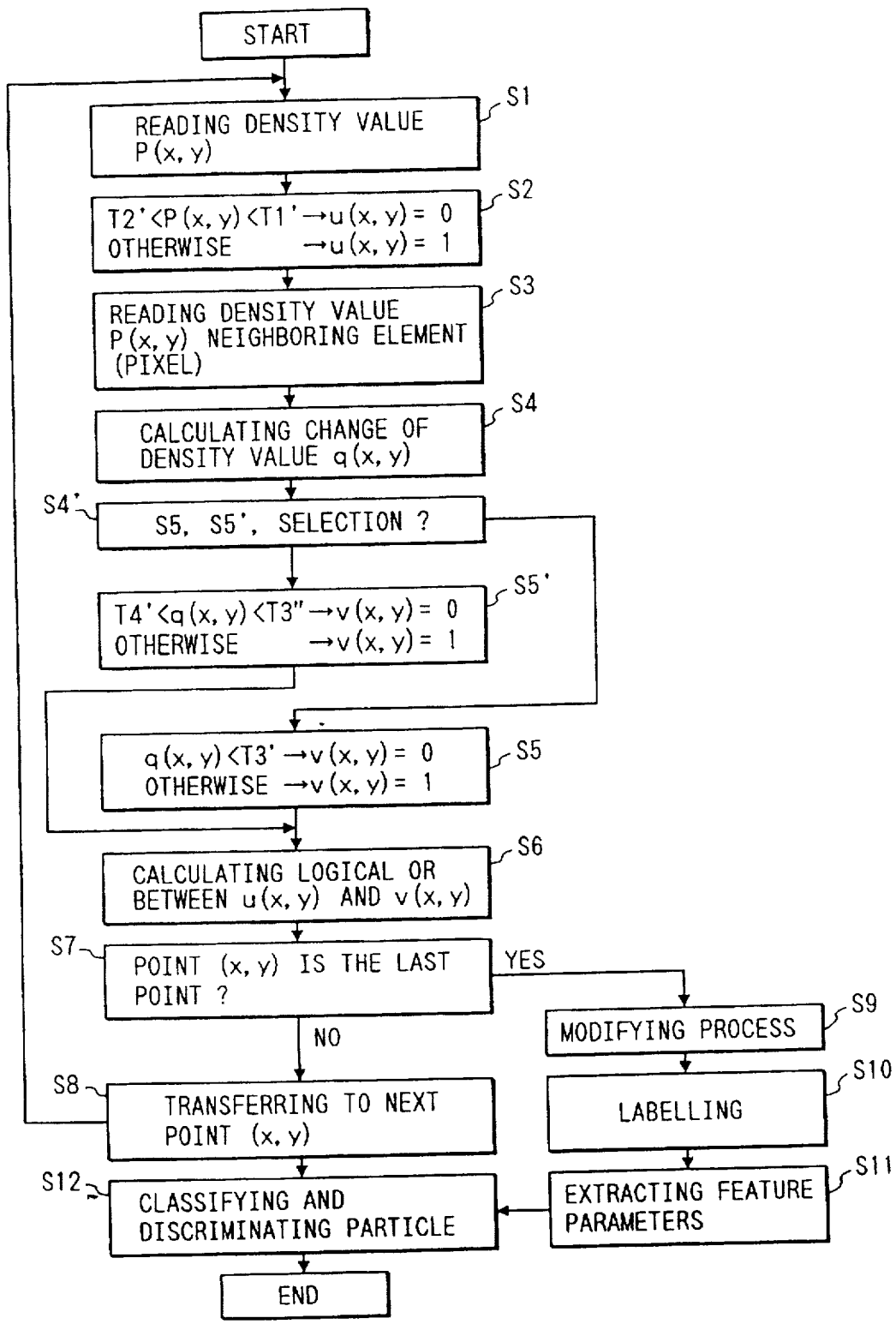
FIG. 22 is a flow chart showing the procedure of segmenting regions of a particle image in the second embodiment of this invention.

FIG. 22 is a flow chart showing the procedure of performing the region segmentation on a particle image in this embodiment. As described above, the particle image to be processed is stored in an image memory. The image used in this embodiment is a greencolored image that is represented by the density value P(x,y) at the position (x,y) of each pixel.

According to the steps shown in FIG. 22, the procedure will be explained.

(Step S1): First, a density value P(x,y) at a pixel (x,y) is read from the image memory.

(Step S2): The density value P(x,y) is converted into a variable u(x,y) representing a binary image shown below.

$$u(x,y)=0 \text{ when } T2'<P(x,y)<T1' \quad (17)$$

$$u(x,y)=1 \text{ when otherwise} \quad (18)$$

where T1' and T2' represent thresholds and are determined as follows. For example, the density value P(x,y) of an image stored in the image memory is read out to generate the histogram of the density value. From the shape of the histogram the density thresholds T1', T2' are determined. Normally, the area of the background region on the image is largest and thus the average density of the background assumes the maximum value on the histogram. As shown in FIG. 5, the density value $P_d$ that gives the maximum value on the histogram is detected and this maximum value is taken as Pmax. Next, density values that give Pmax/2 are detected and are referred to as $P_{hL}$, $P_{hh}$ ($P_{hL}<P_d<P_{hh}$).

By using an appropriate constant k, the thresholds T1', T2' are determined from Equation (19) and Equation (20).

$$T1'=P_d+k(P_{hL}-P_d) \quad (19)$$

$$T2'=P_d+k(P_{hh}-P_d) \quad (20)$$

The constant k is determined experimentally beforehand.

As shown in Equation (17), when T2'<P(x,y)<T1', the pixel (x,y) is deemed as lying in the background region (Equation (17)). When T2'>P(x,y) or P(x,y)>T1', the pixel (x,y) is deemed as lying in the object region (area other than the background region, where a particle to be discriminated from the background region exists) (Equation (18)).

(Step S3): The density values of a plurality of pixels neighboring the pixel (x,y) are read from the memory.

(Step S4): The magnitude of a change in density (the magnitude of change in density at a pixel (x,y) is represented by q(x,y)) is calculated from any of the following methods (a) to (d).

(a) As shown in Equation (21) or Equation (22), the density values of pixels neighboring the pixel (x,y) that were read out in step S3 are divided into two adjoining regions on the image. A summation is taken of densities of pixels belonging to each region. Next, the difference is taken of these two sums (Equation (21)) or its absolute value is determined (Equation (22)).

$$q(x,y) = \sum_{i=1}^{i=n} \{P(x, y+i) - P(x, y-i)\} \quad (21)$$

$$q(x,y) = \left| \sum_{i=1}^{i=n} (P(x, y+i) - P(x, y-i)) \right| \quad (22)$$

For example, by using density values of four pixels neighboring the pixel (x,y) that were read in step S3, P(x,y-2), P(x,y-1), P(x,y+1), P(x,y+2), Equation (21) and Equation (22) are calculated to determine q(x,y).

(b) A variance of the densities of pixels neighboring the pixel (x,y) that were read in step S3 (Equation (23)) or a standard deviation (Equation (24)) is determined. The obtained value is taken to be the magnitude of change in density q(x,y).

$$q(x,y) = \left\{ \frac{1}{(2n+1)^2} \right\} \sum_{i=-n}^{i=n} \sum_{j=-n}^{j=n} \{P(x+i, y+j)\}^2 - \left\{ \frac{1}{(2n+1)^2} \right\}^2 \left\{ \sum_{i=-n}^{i=n} \sum_{j=-n}^{j=n} P(x+i, y+j) \right\}^2 \quad (23)$$

$$q(x,y) = \text{Square root} \left[ \left\{ \frac{1}{(2n+1)^2} \right\} \sum_{i=-n}^{i=n} \sum_{j=-n}^{j=n} \{P(x+i, y+j)\}^2 - \left\{ \frac{1}{(2n+1)^2} \right\}^2 \left\{ \sum_{i=-n}^{i=n} \sum_{j=-n}^{j=n} P(x+i, y+j) \right\}^2 \right] \quad (24)$$

where "square root [ ]" means taking the square root of [ ].

For example, step S3 reads out density values P(i,j) for nine pixels that meet x−1<i<x+1 and y−1<j<y+1 and then Equation (23) or Equation (24) is calculated to determine q(x,y).

(c) The density values of pixels neighboring the pixel (x,y) that were obtained with step S3 are multiplied by weight values w corresponding to the geometrical arrangement of each pixel. The products thus obtained are summed up and this sum is taken as the magnitude of change of density q(x,y) (Equation 25).

$$q(x,y) = \left\{ \sum_{i=-n}^{i=n} \sum_{j=-n}^{j=n} w(i,j)P(x+i, y+j) \right\} \quad (25)$$

For example, nine weight values w(k,m) (k, m=−1, 0, 1) are preset and the density values P(i,j) (x−1<i<x+1, y−1<j<y+1) for nine pixels are read by step S3. Equation (25) is calculated to determine q(x,y). The weight value w may, for example, be w(0,0)=4, w(−1,0)=w(1,0)=w(0,−1)=w(0,1)=1, w(−1, −1)=w(−1, 1)=w(1, −1)=w(1,1)=0.

(d) After determining the magnitude of change of density q(x,y) by using one of the methods (a) to (c), the magnitude of the density change thus obtained is taken as the density value P(x,y):

$$P(x,y)=q(x,y) \quad (26)$$

Then the magnitude of change of density q(x,y) may be calculated by one of the above methods (a) to (c).

For example, according to the method (a), the value of q(x,y) is determined for all pixels (x,y) and then Equation (26) is applied. Next, by using the method (b) the magnitude of density change q(x,y) is calculated again.

(Step S5): The magnitude of change of density q(x,y) is converted into a variable v(x,y) shown below representing the binary image.

When q(x,y) takes only a positive value, the threshold T3' is used.

$$v(x,y)=0 \text{ when } q(x,y)<T3' \quad (27)$$

$$v(x,y)=1 \text{ when } q(x,y)>T3' \quad (28)$$

When q(x,y)<T3', the pixel (x,y) is deemed as lying in the background region (Equation (27)). When q(x,y)>T3', the pixel (x,y) is deemed to exist in the object region (Equation (28)). The threshold T3', can be determined experimentally beforehand.

When q(x,y) takes a negative value, too, (step S5') uses threshold T3" and threshold T4'.

$$v(x,y)=0 \text{ when } T4'<q(x,y)<T3" \quad (29)$$

$$v(x,y)=1 \text{ when other than the above} \quad (30)$$

When T4'<q(x,y)<T3", the pixel (x,y) is regarded as existing in the background region (Equation (29)). When T4'>q(x,y) or q(x,y)>T3", the pixel (x,y) is regarded as existing in the object region (Equation (30)). The threshold T3" and threshold T4' can be determined experimentally beforehand.

(Step S4'): Selection of S5 and S5' is automatically determined according to how q(x,y) is defined in (step S4).

(Step S6): Logical OR is taken of u from (step S2) and v from (step S5) or (step S5') and is regarded as the result of binarization for pixel (x,y).

(Step S7, S8): If the pixel (x,y) is the last pixel to be processed, the processing moves to step S9. If not, the pixel (x,y) is moved to the next pixel where the steps S1 to S6 are repeated (step S7, S8).

(Step S9): The binary image, in which the object region is represented by 1 and the background region by 0, is subjected to modifying processes such as an object region swelling process and a background region noise eliminating process.

(Step S10): For each connected component of the binary image, the labeling process using a known technique is performed to number a plurality of objects in the image.

(Step S11): For each numbered objects, feature parameters such as area, perimeter, average density and projection length are determined.

(Step S12): By using the feature parameters thus obtained, the objects are classified into one of the urine sediment components.

Figure 23:
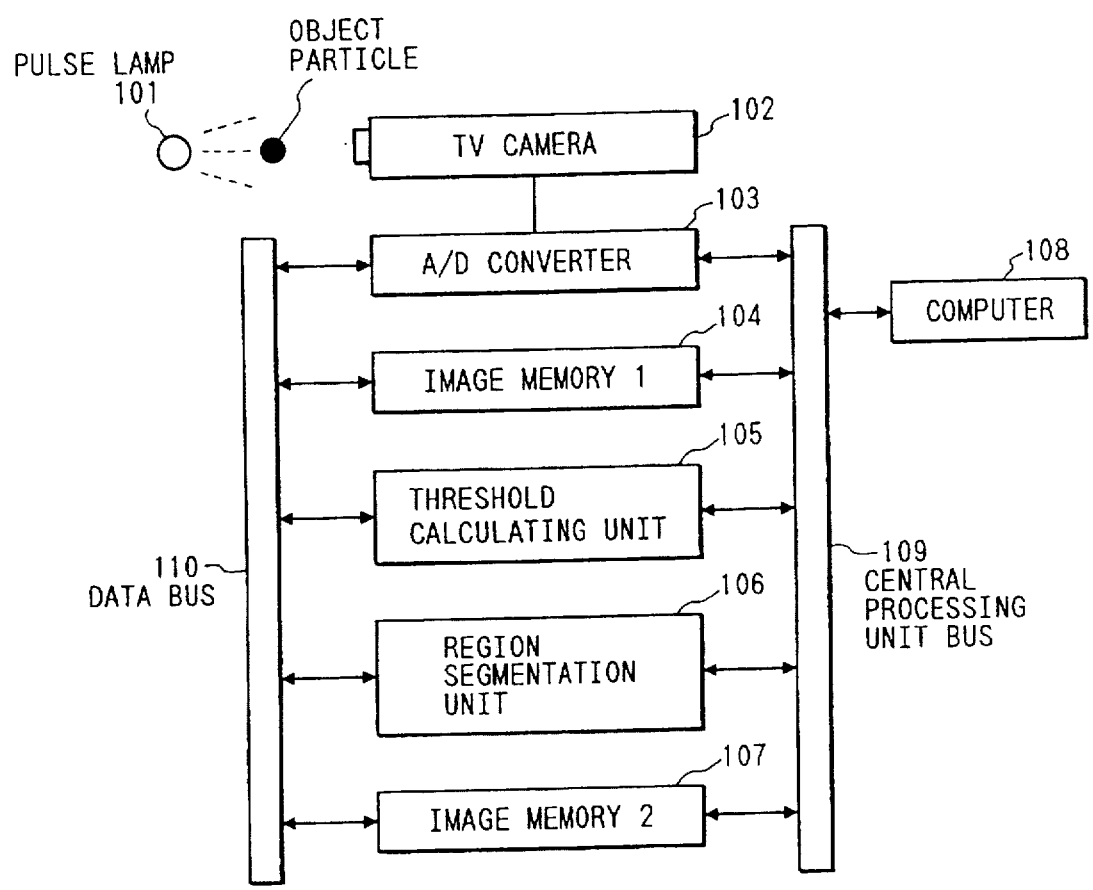
FIG. 23 is an example configuration of an apparatus for implementing the second embodiment of this invention.

FIG. 23 shows the configuration of an apparatus for implementing this embodiment. A particle in the liquid is illuminated with a pulse lamp 101, magnified by an optical magnification system (not shown), photographed by a TV camera 102 and then converted into an analog electric signal. The output of the TV camera 102 is converted by an A/D converter 103 into a digital signal, which is transferred through a data bus 110 into an image memory 104 where it is stored. A threshold calculating unit 105 reads, via the data bus 110, density values of the image stored in the image memory 104 to generate a histogram of the density value and, from the shape of the histogram, determine the thresholds T1', T2' used in a region segmentation unit 106 according to Equation (19) and Equation (20).

The region segmentation unit 106 performs region segmentation based on the density values read from the image memory 104 through data bus 110 and on the thresholds T1', T2' obtained from the threshold calculating unit 105, performs binarization.to represent the object region with 1 and the background region with 0, and then stores, the result of binarization in an image memory 107 through data bus 110. This series of processing is controlled by a computer 108 through a CPU bus 109.

Figure 24:
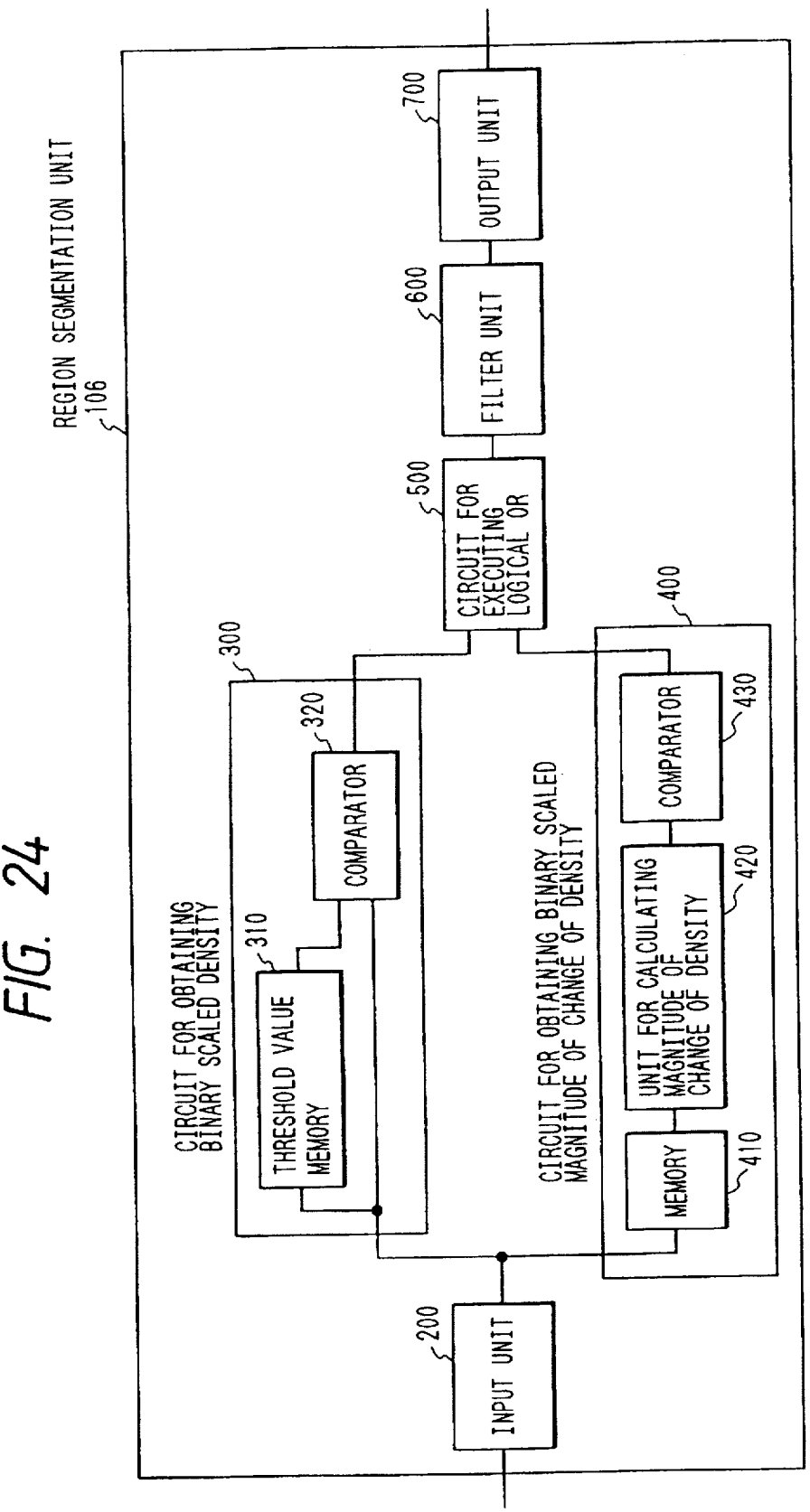
FIG. 24 is a block diagram showing an example configuration of the region segmentation unit of FIG. 23.

FIG. 24 shows the configuration of the region segmentation unit 106 of FIG. 23. An input unit 200 is connected to the data bus 110 of FIG. 23 and controls the input of data through the data bus 110. A density binarization circuit 300 reads the thresholds T1', T2' from the threshold calculating unit 105 (FIG. 23) through the input unit 200 and stores the thresholds T1', T2' in a threshold memory 310. Next, a density value of one pixel on the image is read from the image memory 104 through the input unit 200 and is compared with the thresholds T1', T2' by a comparator 320. Let the position of a pixel on the image be (x,y) and the density for that pixel be P(x,y). The comparator 320 compares the density value P(x,y) with the thresholds T1', T2'. If it finds that T2'<P(x,y)<T1', the comparator 320 regards its pixel as lying in the background region and output 0. When the density is other than the above, the comparator 320 outputs 1 indicating that the pixel exists in the object region.

In parallel with the density binarization described above, a density change binarization circuit 400 is activated. The density change binarization circuit 400 reads density values of a plurality of pixels neighboring the pixel (x,y) on the image from the image memory 104 through the input unit 200, and stores the density values in a memory 410. A density change calculation unit 420 calculates a change of density according to one of the following methods (a) to (d) by using the density values of the pixels neighboring the pixel (x,y) stored in the memory 410. The magnitude of change of density at the pixel (x,y) is represented by q(x,y).

(a) The pixel density values stored in the memory 410 are grouped into two adjoining regions of the image. Density values are summed up for the pixels belonging to each region. Next, the difference of these two sums or its absolute value is determined and is taken to be q(x,y). For example, density values of four pixels P(x,y−2), P(x,y−1), P(x,y+1), P(x,y+2) are stored in the memory 410 and Equation (31) or Equation (32) is calculated to determine q(x,y).

$$q(x,y) = \sum_{i=1}^{i=2} P(x, y+i) - \sum_{i=1}^{i=2} P(x, y-i) \quad (31)$$

$$q(x,y) = \left| \sum_{i=1}^{i=2} P(x, y+i) - \sum_{i=1}^{i=2} P(x, y-i) \right| \quad (32)$$

Figure 25:
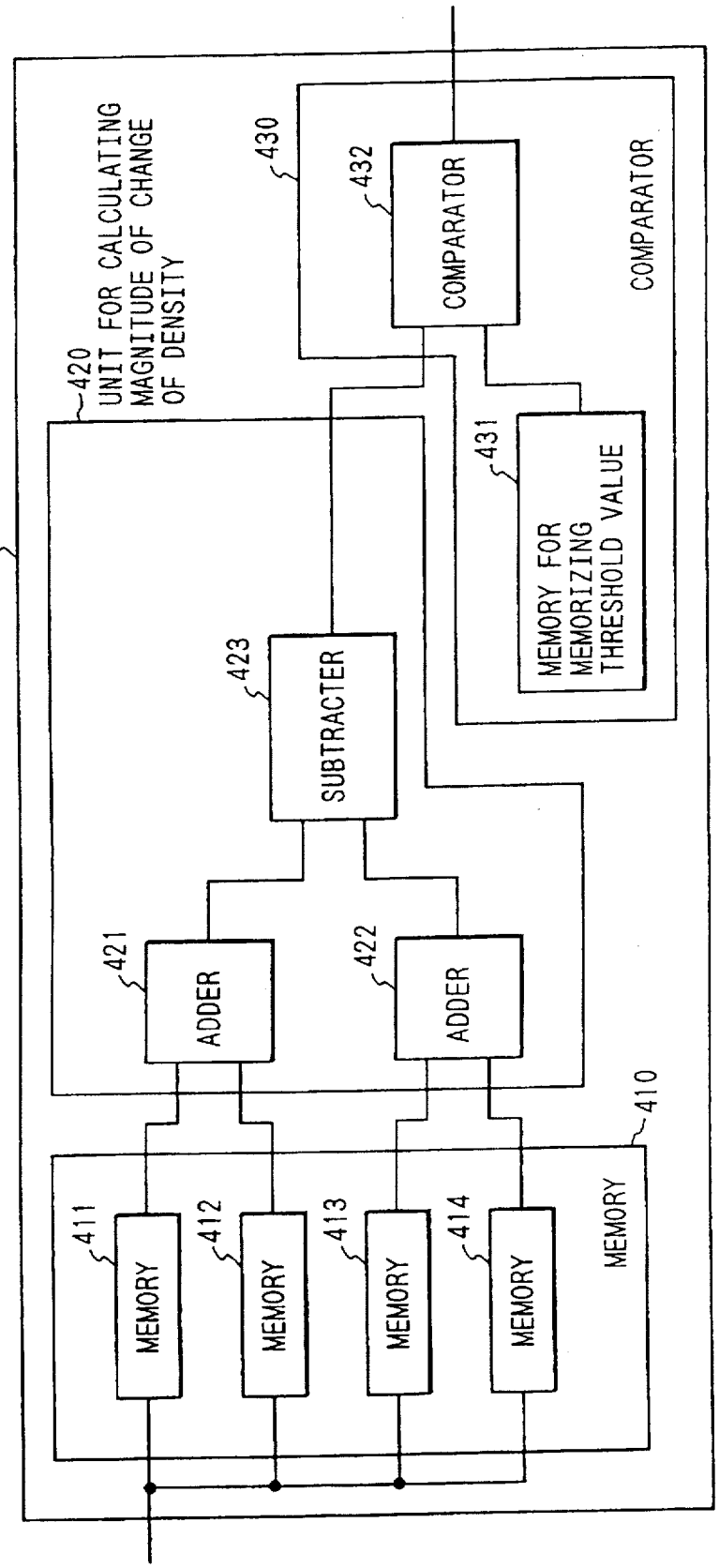
FIG. 25, 26, 27 and 28 are example circuit configurations of a change of density calculation unit.

FIG. 25 shows an example configuration of the density change binarization circuit 400. The memory 410 consists of four memories 411–414 each storing one density value. The density value P(x,y−2), P(x,y−1), P(x,y+1), P(x,y+2) are stored in the memories 411–414 respectively.

The density change calculation unit 420 includes two adders 421, 422 and one subtractor 423 and performs calculation defined by Equation (31). The output of the adder 421 represents a value calculated by the second term of the right-hand side of Equation (31), and the adder 422 outputs a value calculated by the first term on the right-hand side of Equation (31). The subtractor 423 outputs a value calculated by the right-hand member of Equation (31). When the subtractor 423 is provided with a function to output an absolute value, the calculation defined by Equation (32) can be performed.

(b) Variance, or standard deviation, of densities stored in the memory 410 is determined and is taken as the magnitude of change of density q(x,y). For example, density values P(i,j) of nine pixels that satisfies the conditions of x−1<i<x+1 and y−1<y+1 are stored in the memory 410. The magnitude of change of density q(x,y) is calculated from the following equations (33) or (34).

$$q(x, y) = \frac{1}{9} \sum_{i=-1}^{i=1} \sum_{j=-1}^{j=1} \{P(x+i, y+j)\}^2 - \tag{33}$$

$$\frac{1}{81} \left\{ \sum_{i=-1}^{i=1} \sum_{j=-1}^{j=1} P(x+i, y+j) \right\}^2$$

$$q(x, y) = \text{Square root} \left[ \frac{1}{9} \sum_{i=-1}^{i=1} \sum_{j=-1}^{j=1} \{P(x+i, y+j)\}^2 - \tag{34}$$

$$\frac{1}{81} \left\{ \sum_{i=-1}^{i=1} \sum_{j=-1}^{j=1} P(x+i, y+j) \right\}^2 \right]$$

where "square root [ ]" means taking the square root of [ ].

Figure 26:
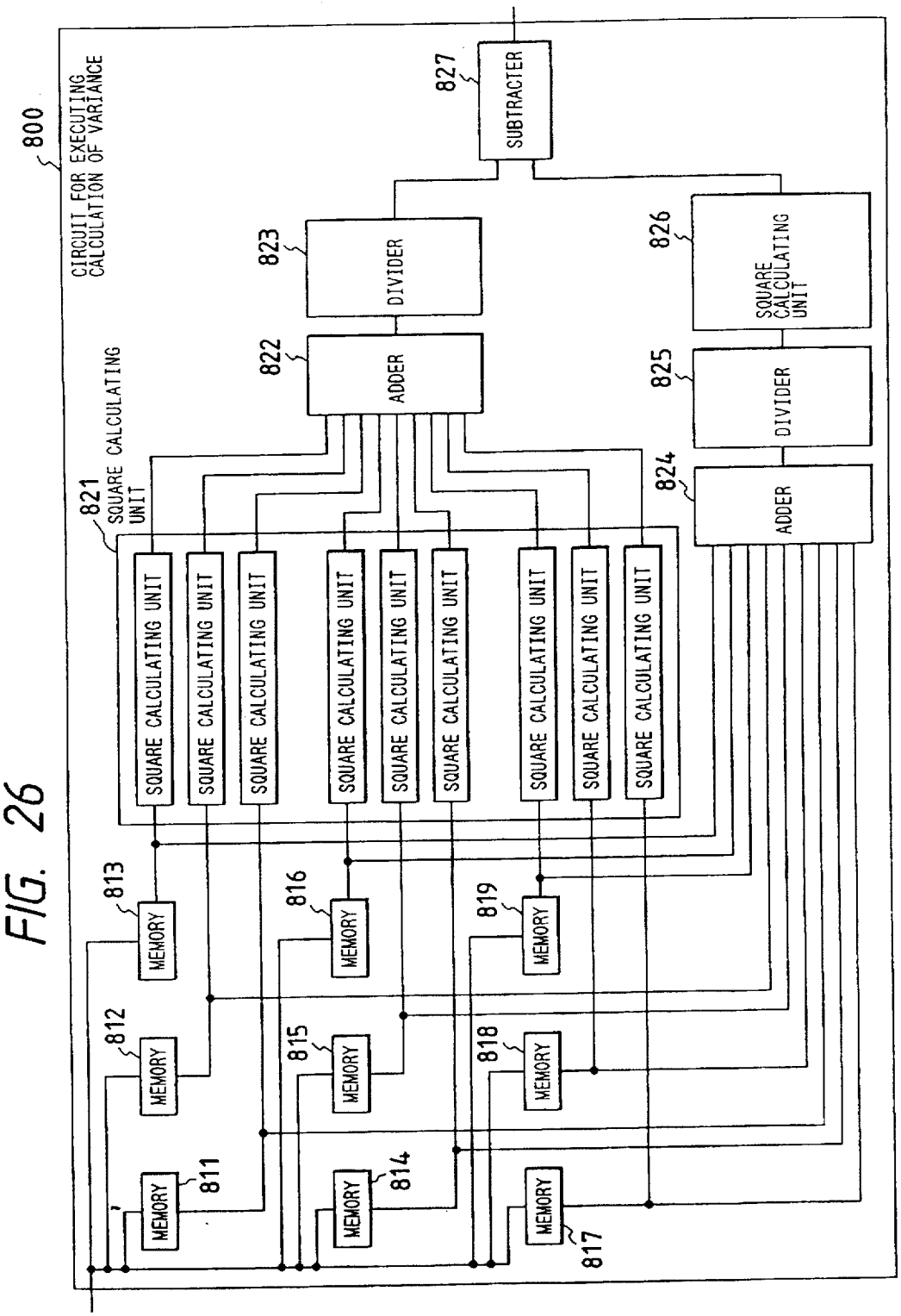

FIG. 26 shows an example circuit configuration of the memory 410 and the density change calculation unit 420. The memory 410 consists of nine memories 811–819 each storing one density value. Density values P(i,j) of nine pixels that meet the conditions of x−1≤i≤x+1 and y−1≤j≤y+1 are stored in these memories 811–819. The density change calculation unit 420 includes a square calculation unit 821 consisting of nine square calculators, adders 822, 824, dividers 823, 825, a square calculator 826 and a 827 subtracter 827. The values read from the memories 811–819 are each divided in two, one being entered into the square calculating unit 821 and the other into the adder 824. The adder 822 calculates the sum of the outputs of nine square calculators 821 and the sum produced by the adder 822 is divided by 9 with the divider 823. The divider 823 outputs a value calculated by the first term on the right-hand side of Equation (33).

The adder 824 calculates the sum of nine density values read from the memories 811–819, and the output of the adder 824 is divided by 9 with the divider 825. The square calculator 826 outputs a value calculated by the second term on the right-hand side of Equation (33). The subtracter 827 calculates a difference between the output of the divider 823 and the output of the square calculator 826. The subtracter 827 outputs a value calculated by the right-hand member of Equation (33). If a circuit for calculating a square root is provided after the subtracter 827, it is possible to output a value calculated by the righthand member of Equation (34).

(c) The density values of pixels stored in the memory 410 are multiplied with weight values w corresponding to the geometrical positions of the pixels on the image, and the summation of these products is taken to be the magnitude of change of density q(x,y). For example, nine weight values w(k,m) (k, m=−1, 0, 1) are set beforehand and the density values for nine pixels P(i,j) (x−1≤i≤x+1, y−1j≤y+1) are saved in the memory 410. Then q(x,y) is calculated according to Equation (35).

$$q(x, y) = \left\{ \sum_{i=-1}^{i=1} \sum_{j=-1}^{j=1} w(i, j) P(x+i, y+j) \right\} \tag{35}$$

The weight values may be w(0,0)=−4, w(−1,0)=w(1,0) =w(0,−1)=w(0,1)=1, w(−1,−1) w(−1,1)=w(1,−1) =w(1,1)=0.

Figure 27:
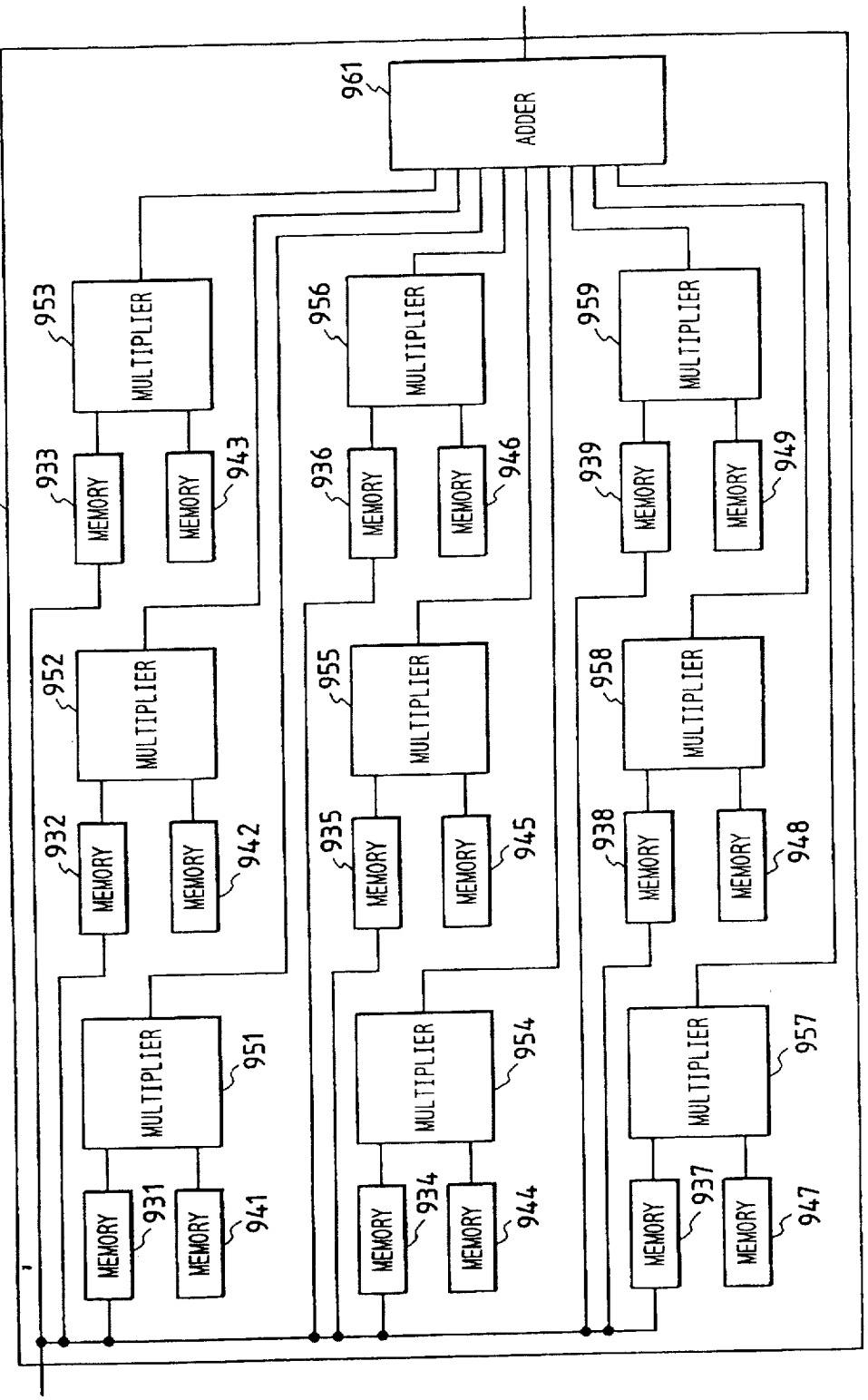

FIG. 27 shows an example circuit configuration of the memory 410 and the density change calculation unit 420. The memory 410 consists of nine memories 931–939 each storing one density value. The density values P(x−1,y−1), P(x,y−1), P(x+1,y−1), P(x−1,y), P(x,y), P(x+1,y), P(x−1,y+1), P(x,y+1), P(x+1,y+1) are stored in the memories 931–939 respectively. The weight value memories 941–949 are preset with weight values w(−1,−1), w(0,−1), w(1,−1), w(−1,0), w(0,0), w(1,0), w(−1,1), w(0,1) and w(1,1). The multipliers 951–959 calculates the products of density values and weight values and the adder 961 sums up nine products.

(d) According to one of the above methods (a) to (c), the magnitude of change of density is determined. This magnitude of change of density is deemed as a density value, and then the magnitude of change of density is again calculated according to one of the methods (a) to (c). The value thus obtained may be taken to be q(x,y).

Figure 28:
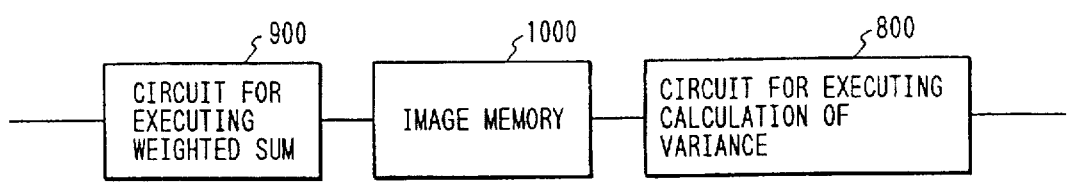

For example, the value of q(x,y) is calculated for all pixels (512×512 pixels, for instance) according to the above method (c). By substituting q(x,y) as follows, $$P(x,y)=q(x,y) \tag{36}$$

the method (b) is used to calculate q(x,y) again. In this case, the memory 410 and the density change calculation unit 420 can be replaced with a density change calculation unit whose circuit configuration is shown in FIG. 28.

First, a weighted sum calculation unit 900 calculates the right-hand member of Equation (35) for all pixels and stores the values obtained in an image memory 1000. Next, a variance calculation unit 800 calculates the right-hand member of Equation (33) by taking the values stored in the image memory 1000 as density values and then outputs the calculated value. The configurations of the weighted sum calculation unit 900 and the variance calculation unit 800 are shown in FIG. 27 and FIG. 26, respectively.

The comparator 430 of FIG. 24 consists of a threshold memory 431 and a comparator 432 as shown in FIG. 25. The thresholds T3' or T3", T4' are stored in the threshold memory 431 beforehand. If the magnitude of change of density q(x,y) assumes only a positive value, when q(x,y)<T3', the pixel in question is considered to exist in the background region and 0 is output. When q(x,y) is other than the above, the pixel is assumed to exist in the object region and 1 is output.

If q(x,y) takes a negative value, too, and when T4'<q(x, y)<T3", 0 is output. When q(x,y) takes other values, 1 is output. The thresholds T3', T3", T4' can be experimentally determined beforehand. Next, a logical OR circuit 500 takes a logical OR of the output from the density binarization circuit 300 and the output from the density change binarization circuit 400. The above processing is performed for all pixels to produce a binary image with the object region represented by 1 and the background region represented by 0. The binary image generated in this manner is filtered by a filter unit 600 whereby the object region is swelled and the background region is shrunk to eliminate background noise. The binary image thus modified is output onto the data bus 110 from the output unit 700 (FIG. 24).

The process of this embodiment may be summarized as follows.

(1) Density correction process: In the greencolored image, density irregularities resulting from distortion of the optical system are removed.

(2) Region segmentation: The green-colored image is region-segmented based on quantities representing density and change of density to generate a binary image whose background region is represented by 0 and object region is represented by 1.

(3) Modifying process: The binary image is subjected to the modifying and shaping process whereby the object region is swelled and background noise is eliminated.

(4) Labeling: Each connected component in the binary image is labeled to number a plurality of objects in the image.

(5) Determining feature parameters: For each numbered object, the feature parameters including area, perimeter and average density are determined.

(6) Identification: Based on the feature parameters, check is made to identify what urine sediment component each object is.

The processes (3) to (6) may use known conventional techniques including swelling and shrinking process.

(Embodiment 3)

This embodiment uses the configuration of the first embodiment (region segmentation is performed by setting thresholds of density in green-colored image and red-colored image) instead of using the configuration of the second embodiment in which the region segmentation is done by setting a threshold of density in the green-colored image.

Results of region segmentation processes applied to many samples have found that the method of region segmentation of the first embodiment can extract stained cells more correctly than non-stained cells and that the method of the second embodiment, because it uses only a green-colored image, extracts the stained cells not as clearly as the first embodiment when the green-colored image of the stained particles is blurred. In this embodiment, because thresholds are set for the density of green-colored image and red-colored image, the region segmentation can use the information of the red-colored image when the greencolored image is not clear, making it possible to extract the object particle more precisely than in the first and second embodiment.

The processes of this embodiment may be summarized as follows.

(1) Density correction process: In the greencolored image and the red-colored image, density irregularities resulting from distortion of the optical system are removed.

(2) Region segmentation: In the green-colored image and the red-colored image, a plurality of thresholds are used for region segmentation to generate binary images with the background region represented by 0 and the object region represented by 1.

(3) Region segmentation: Based on quantities representing density change in the green-colored image, the green-colored image is region-segmented to generate a binary image with the background region represented by 0 and the object region represented by 1.

(4) Region segmentation: Logical OR is taken of the binary images obtained in (2) and (3).

(5) Modifying process: The binary image is subjected to the modifying and shaping process whereby the object region is swelled and background noise is eliminated.

(6) Labeling: Each connected component in the binary image is labeled to number a plurality of objects in the image.

(7) Determining feature parameters: For each numbered object, the feature parameters including area, perimeter and average density are determined.

(8) Identification: Based on the feature parameters, check is made to identify what urine sediment component each object is.

Processes (5) and (6) may use known conventional techniques including the filter process such as swelling and shrinking. Further, the process (5) may be performed on the result of (2) and (3) and instead the process (5) may be omitted.

Whichever of the region segmentation (2) and (3) may come first. Alternatively, they may be performed parallelly.

From a red component image (red-colored image), a green component image (green-colored image) and a blue component image (blue-colored image) of an object particle, the red component image (red-colored image) and the green component image (green-colored image) are selected as in the first embodiment. Further, as in the second embodiment, the green component image (green-colored image) is selected and the configuration of the first embodiment is incorporated into a part of the configuration of the second embodiment. Region segmentation was performed on the same 51 images that were used in the second embodiment and which contain squamous epithelial cells that are most likely not to be stained. In all 51 images including eight images having non-stained particles, a good region segmentation result was obtained. That is, with the configuration of the first embodiment incorporated into a part of the configuration of the second embodiment, a good region segmentation was able to be carried out which could not be obtained with the single method of the first or second embodiment. This combined method makes it possible to region-segment as one connected object region almost all object particles including,non-stained cells that were difficult to region-segment ideally as one region with a single method. This combined method therefore improves the precision of discriminating the sediment components.

This embodiment can discriminate the background region correctly and extract individual object regions stably, producing more precise binary images even when the image contain a mixture of well-stained particles and particles difficult to stain when specimens are stained (including particles not stained well and those hardly stained). As a result, the feature parameters of the object regions can be determined more precisely and erroneous discrimination of object particles minimized. Therefore, even when a specimen includes a mixture of object particles having differing stained levels and objects with bad stain characteristic which are hardly stained, precise region segmentation can be performed for each object particle, improving the discrimination of a variety of kinds of sedimentation components.

Figure 30:
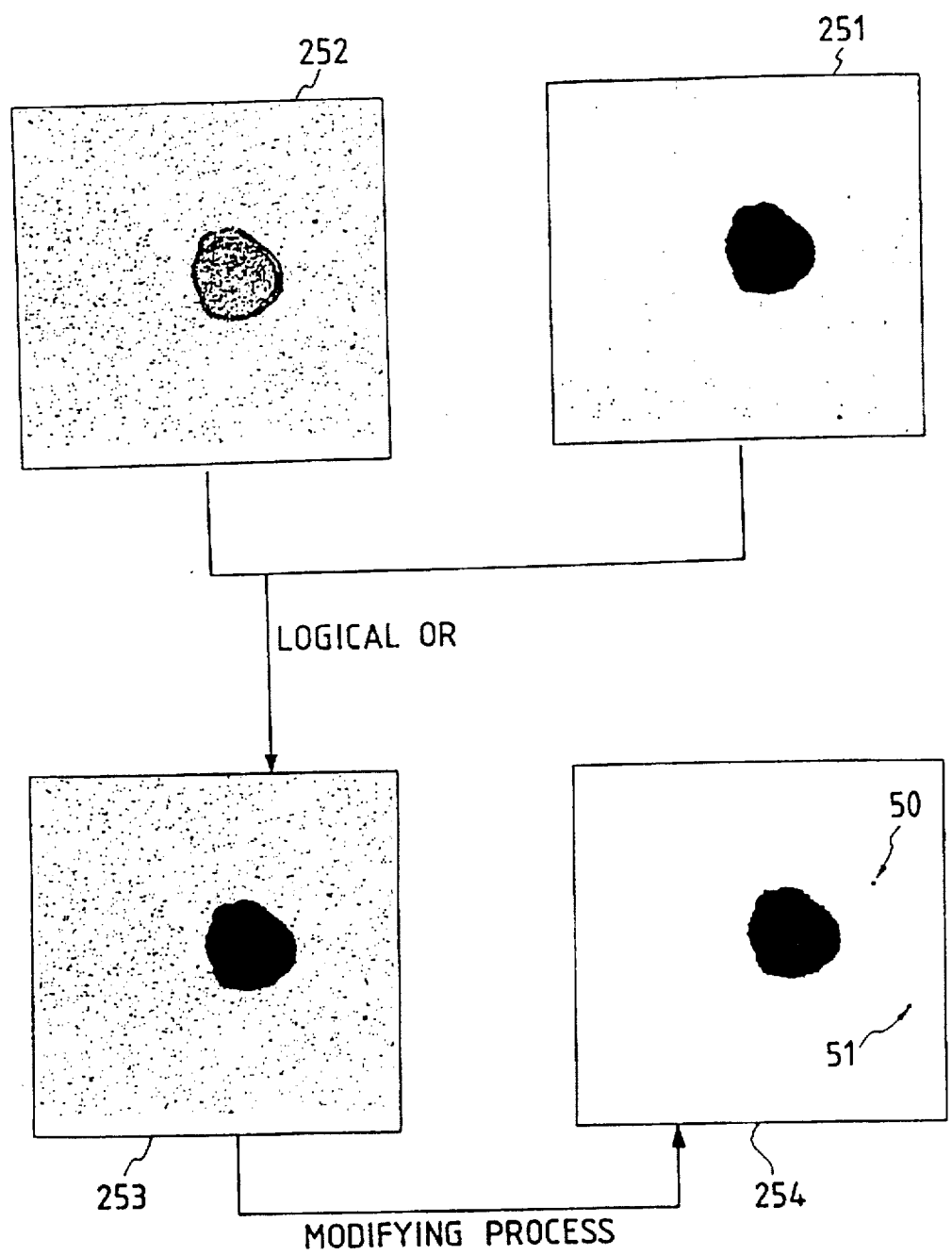
FIG. 30 and FIG. 31 are example results of region segmentation of an actual specimen in a third embodiment of this invention.
Figure 31:
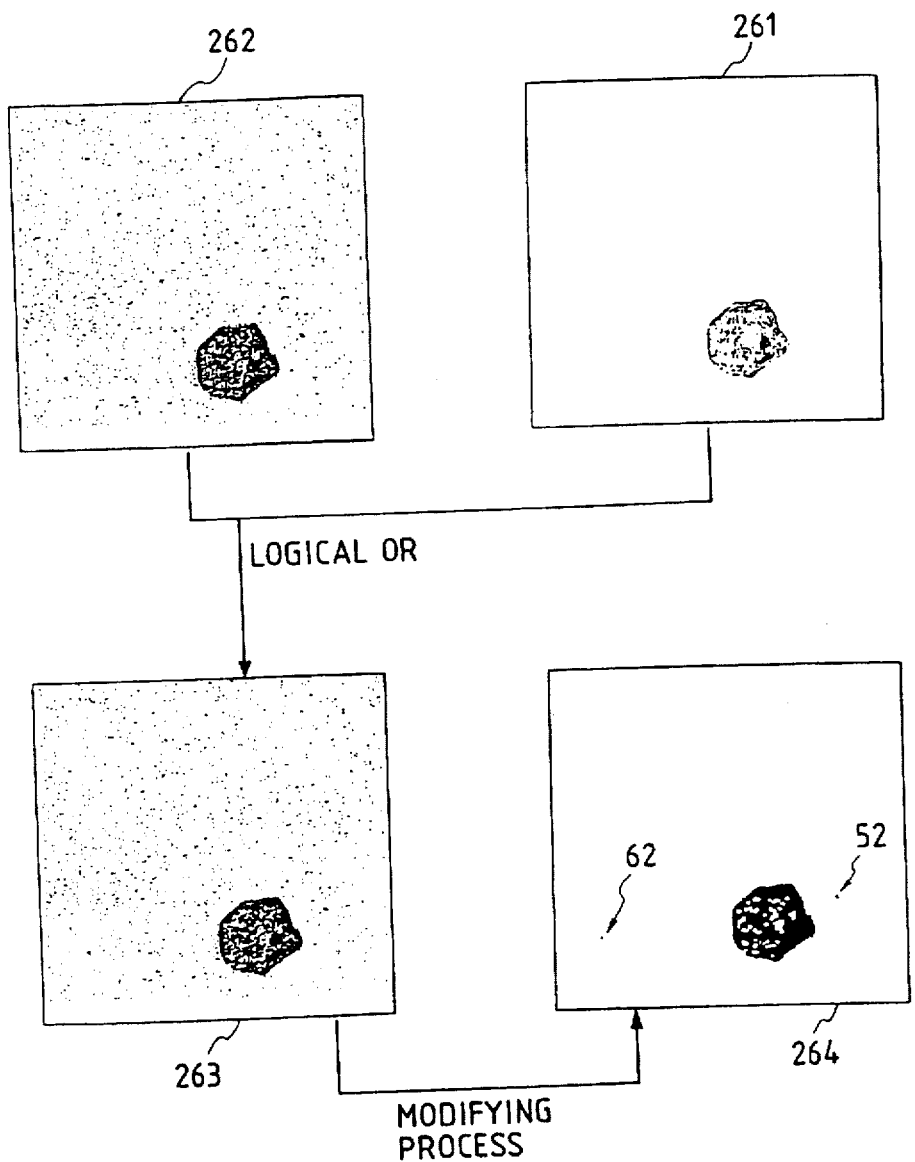

FIG. 30 and 31 show the results of region segmentation of this embodiment performed on actual specimens. The specimen of FIG. 30 is the same as shown in FIG. 6, 14 and 16 and is an example of a well-stained cell (stained cell). The specimen of FIG. 31 is the same as shown in FIG. 7, 15 and 17 and is an example of a poorly stained cell (non-stained cell).

In FIG. 30 and 31, binary images 251, 261 represent the results of the region segmentation according to the method that sets thresholds in the density value for the green-colored image and the red-colored image of the first embodiment. Binary images 252, 262 represent the results of the region segmentation according to the method that sets thresholds in quantity representing a change of density value for the green-colored image of the second embodiment (by using difference value for n=2). A binary image 253 is the result of logical OR of the binary images 251 and 252. A binary image 263 is the result of logical OR of the binary images 261 and 262. These region-segmented binary images 251, 261, 252, 262, 253, 263 are not subjected to the modifying process (correction and shaping processes, such as swelling of object region and elimination of background noise). Binary images 254, 264 are the binary images 253, 263 that have undergone the modifying process. Performing the modifying process on the binary image 251 produces an image of FIG. 6; and performing the modifying process on the binary image 261 produces an image of FIG. 7.

The method of the third embodiment can extract particles in the image leaving almost no particles undetected when it is difficult for a single method of the first or second embodiment to extract particles in the specimen.

(Embodiment 4)

This embodiment takes logical OR of two or three of the binary images produced by the region segmentation method according to Embodiment 1 to Embodiment 3 to generate a new binary image, thereby extracting object particles more precisely.

Figure 29:
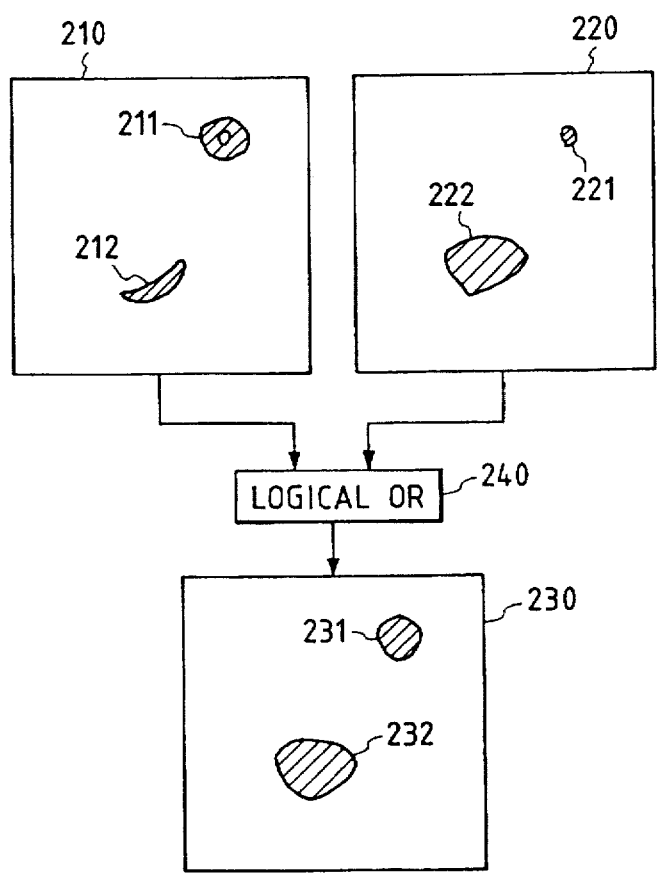
FIG. 29 is a schematic diagram showing the combining of two binary images whose regions are segmented by two different methods in a fourth embodiment of this invention.

FIG. 29 schematically explains about the method of this embodiment, which combines two binary images that were region-segmented by two different methods (based on the first and second embodiment). The binary image 210 generated by the region-segmentation method of the first embodiment and the binary image 220 generated from the quantity representing the change of density in the green-colored image by the method of the second embodiment are combined to generate a new binary image 230. This synthesized image is obtained by taking logical OR of the above two binary images 210 and 220. A particle image 212 in the binary image 210 picks up only a part of the periphery of the particle image 222 detected in the binary image 220. Conversely, a particle image 221 in the binary image 220 picks up only a part of the interior of the particle image 211 found in the binary image 210 (a part of the interior of the particle image 211 is identified as the background region).

The new binary image 230, which is synthesized by taking logical OR of the two binary images 210 and 220, reveals particle images 231, 232. In this way, this method compensates for the drawbacks of the region segmentation methods of the preceding embodiments and produces a binary image with improved quality that extracts object particles more precisely. While the above description uses logical OR as a means of synthesizing, other logical operations may be appropriately selected depending on the process conditions of a specimen to be image-processed (stain conditions), the kind of specimen and the kind of object particles.

Which of the red-colored image, green-colored image and blue-colored image should be used for region segmentation shall be determined for each of the region segmentation methods of the preceding embodiments, by taking into consideration optical characteristic of a specimen to be analyzed and levels and variations of a signal representing a background region and a signal representing an object region where object particles exist. Although logical OR is adopted as a logical operation for the region segmentation to extract the object particles, any other appropriate logical operation may be used depending on the process conditions of a specimen to be image-processed (stain conditions), the kind of specimen and the kind of object particles.

A stain is usually added to a urine specimen to dye cells of sediment components normally in blue, red or purplish red. The conventional region segmentation methods utilize the color difference between background, which is normally white, and the sediment components, set thresholds in image signals for each of the red-colored image, green-colored image and blue-colored image and takes the white area as the background region and other areas as object regions where object particles exist. Such conventional methods, however, cannot correctly detect particles that failed to be stained well. This is because, of the precipitated cells, those with high activity, which are not completely dead, have a tendency of not absorbing dye and remain unstained or transparent and the regions where cells exist have almost the same color tone as the background region. Hence, cell regions cannot be extracted correctly by the conventional simple region segmentation method.

Cells not well stained are colorless and transparent, and the interior or surface of the cells has uneven characteristics that cause refraction and diffusion of light, resulting in a large change in density value in the region of the image where the cells exist. With the simple region segmentation method, the region where only one cell exists appears divided in smaller regions, which are wrongly identified as different discrete sediment components, lowering the discriminating rate.

This invention utilizes such small changes of density in cell images according to locations. That is, the region segmentation of this invention involves calculating the quantity that represents a change in density at each point on the image and setting thresholds in the density value and in the quantity representing a change of density. This method allows correct region segmentation even when object particles are not well stained.

(Embodiment 5)

By referring to FIG. 32, apparatuses for extracting particle images that apply the methods of the first to fourth embodiment are described in the following.

Image signals of a specified photograph region in the green-colored image, red-colored image and bluecolored image from the TV camera 102 are converted into digital image data for 512×512 pixels by the A/D converter 103. For each pixel of the image data, the following processes are performed to distinguish between a region where particles exist and a background region and generate a region-segmented binary image.

A density correction circuit 72 corrects density irregularities according to Equation (2) or Equation (3) by using data stored in a correction data memory 70 for correcting density irregularities resulting from distortion of the imaging optical system. The result of correction is stored in the image memory 90. The above configuration is common to the apparatuses that implement the first to third embodiment.

Example apparatuses that implement the first to fourth embodiment are described below.

Figure 32:
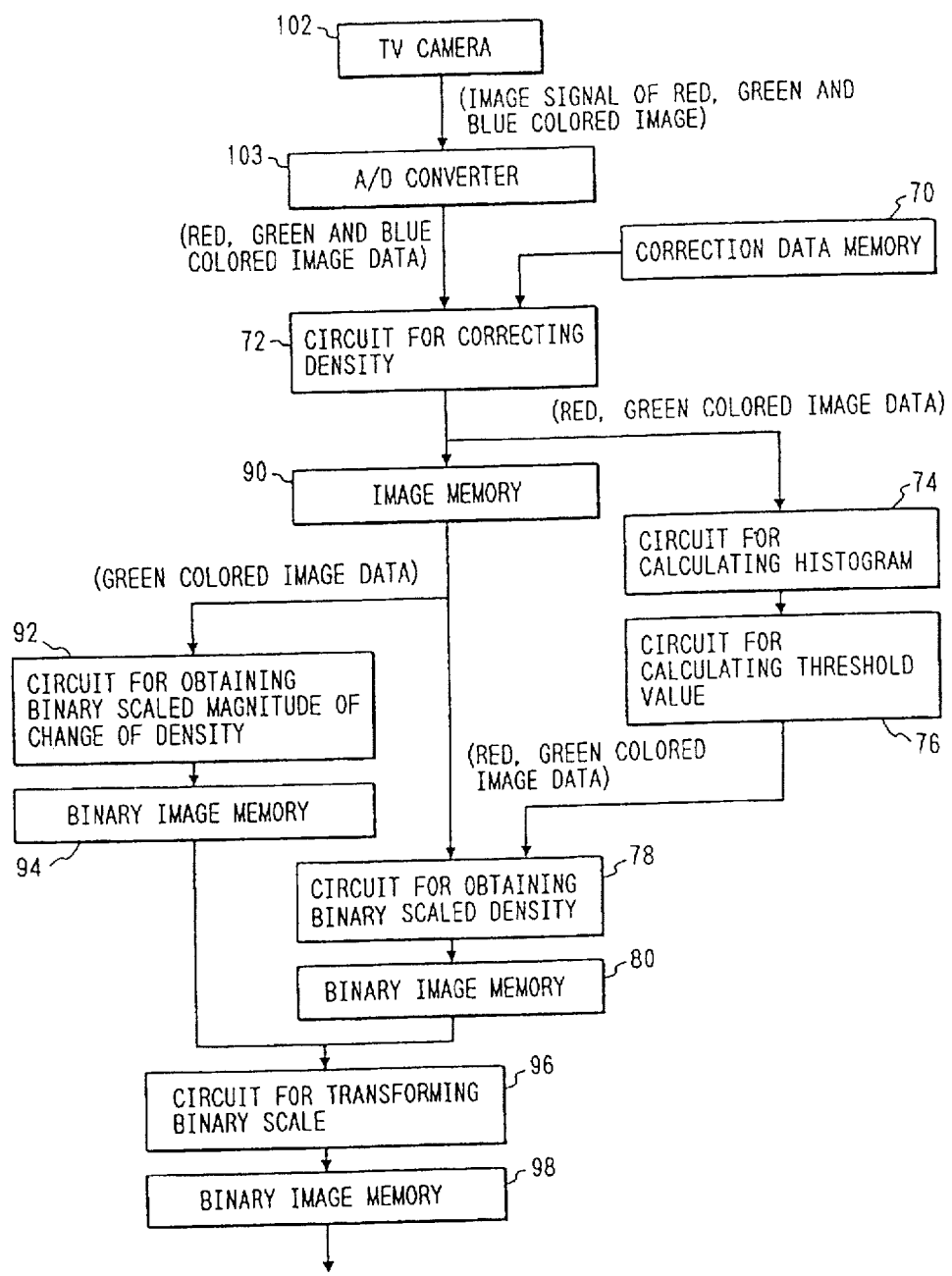
FIG. 32 is an example configuration of an apparatus that applies the particle image region segmentation method of this invention.

(a) The apparatus that implements the first embodiment includes, of the configuration shown in FIG. 32, a histogram calculation circuit 74, a threshold calculation circuit 76, a density binarization circuit 78 and a binary image memory 80. The histogram calculation circuit 74 generates histograms for the green-colored image and red-colored image by using the red- and green-colored image data whose density irregularities were corrected by the density correction circuit 72. The threshold calculation circuit 76 calculates thresholds T1, T2, T3, T4 according to Equation (5) through Equation (8). The density binarization circuit 78 detects the background region from the green- and red-colored image data according to Equation (9) by using the thresholds T1, T2, T3, T4, binarizes the image data and then stores the binary image data in a binary image memory 80. In the apparatus for the first embodiment, the density binarization circuit 78 and the binary image memory 80 serve a binarization circuit 96 and a binary image memory 98, respectively.

(b) The apparatus that implements the second embodiment includes, of the configuration shown in FIG. 32, a density change binarization circuit 92 that detects the magnitude of change of density between pixels in the green-colored image data read from the image memory 90 whose density irregularities were corrected; a binary image memory 94 that stores the result of density change binarization operation; a histogram calculation circuit 74 that uses the greencolored image data of the red- and green-colored image data whose density irregularities were corrected as explained in (a); a threshold calculation circuit 76; a density binarization circuit 78; and a binary image memory 80. The configuration of the density change binarization circuit 92 is similar to the ones shown in FIG. 25, 26, 27 and 28 that were described in detail in connection with the second embodiment. The binarization circuit 96 takes logical OR of data stored in the binary image memory 80 and data in the binary image memory 94 to perform region segmentation and then stores the result in the binary image memory 98.

The process involving the histogram calculation circuit 74, threshold calculation circuit 76 and density binarization circuit 78 is performed in parallel with the process of the density change binarization circuit 92 and can be increased in speed.

In the above, we have described a case where density values of the green-colored image and red-colored image data are used. The configuration is not limited to this and the two kinds of image data used may appropriately be selected from among the red-, green- and blue-colored image data. By using the selected image data, the threshold calculation circuit 76 calculates a plurality of thresholds and the density binarization circuit 78 stores the binarized image data in the binary image memory 80.

In the above, we have described the configuration of the density change binarization circuit 92 that detects the magnitude of change of density between pixels in the green-colored image data and of the binary image memory 94 that stores the result detected. Other configuration may be used. For example, one or two more circuits consisting of the density change binarization circuit 92 and the binary image memory 94 may be connected in parallel to parallelly detect the magnitude of change of density between pixels in one image data-blue- or red-colored image data-or in two image data-blue- and red-colored image data-in addition to the green-colored image data. The binarization circuit 96 may then perform logic operation, such as logical OR, on the images that were detected by the parallel density change binarization circuits 92 and stored in the plurality of binary image memories 94 and on the images stored in the binary image memory 80. The resulting binary image may be stored in the binary image memory 98.

Because this configuration generates the binary image data by using a plurality of images from among the red-, green- and blue-colored image data and detecting the magnitude of change of density between pixels in each of the images, it is possible to discriminate particle regions where particles exist more accurately than when the binary image data is obtained by using a single image from among the red-, green- and blue-colored image data and detecting the magnitude of change of density between pixels in the selected image.

(c) The apparatus that implements the third embodiment has the configuration shown in FIG. 32. That is, it has a combined configuration of (a) and (b). In more detail, this apparatus includes a density change binarization circuit 92, which detects the magnitude of change of density between pixels in a green-colored image data-which was read from the image memory 90 and whose density irregularities were corrected-and generates a binary image data; a binary image memory 94 to store the binary image data; a histogram calculation circuit 74, which generates histograms of the green- and red-colored images by using the red- and green-colored image data whose density irregularities were corrected; a density binarization circuit 78, which, by using the thresholds T1, T2, T3, T4, detects the background region from the green- and red-colored image data according to Equation (9) to produce binary image data; a binary image memory 80 to store the binary image data; a binarization circuit 96 that takes logical OR of the data stored in the binary image memory 80 and the data in the binary image memory 94; and a binary image memory 98 that stores the result of logical OR operation, i.e., the result of region segmentation. The configuration of the density change binarization circuit 92 has already been detailed in connection with the second embodiment and is similar to the ones shown in FIG. 25, 26, 27 and 28.

The process involving the histogram calculation circuit 74, threshold calculation circuit 76 and density binarization circuit 78 is performed in parallel with the process of the density change binarization circuit 92 and can be increased in speed.

In the above, we have described a case where density values of the green-colored image and redcolored image data are used. The configuration is not limited to this and the two kinds of image data used may appropriately be selected from among the red-, green- and blue-colored image data. By using the selected image data, the threshold calculation circuit 76 calculates a plurality of thresholds and the density binarization circuit 78 stores the binarized image data in the binary image memory 80. Further, a plurality of circuits, each consisting of the histogram calculation circuit 74, the threshold calculation circuit 76, the density binarization circuit 78 and the binary image memory 80, may be connected in parallel. Density values of, say, greenand blue-colored image data may be used in addition to the density values of green- and red-colored image data, and binary images from these image data may be stored in the plurality of binary image memories 80. The binarization circuit 96 may then perform logic operation, such as logical OR, on the image stored in the binary image memory 80 and on the images stored in the plurality of binary image memories 80. The resulting binary image may be stored in the binary image memory 98.

While in the above we have explained about the configuration of the density change binarization circuit 92 that detects the magnitude of density change between pixels in, the green-colored image data and of the binary image memory 94 that stores the detected result, other configuration may be employed. For example, one or two more circuits consisting of the density change binarization circuit 92 and the binary image memory 94 may be connected in parallel to parallelly detect the magnitude of change of density between pixels in one image data-blue- or red-colored image data-or in two image data-blue- and redcolored image data-in addition to the green-colored image data. The binarization circuit 96 may then perform logic operation, such as logical OR, on the images that were detected by the parallel density change binarization circuits 92 and stored in the plurality of binary image memories 94 and on the images stored in one or more binary image memories 80. The resulting binary image may be stored in the binary image memory 98.

Because this configuration generates the binary image data by using a plurality of images from among the red-, green- and blue-colored image data and detecting the magnitude of change of density between pixels in each of the images, it is possible to discriminate particle regions where particles exist more accurately than when the binary image data is obtained by using a single image from among the red-, green- and blue-colored image data and detecting the magnitude of change of density between pixels in the selected image.

(d) The apparatus that implements the fourth embodiment has a configuration described in (a) and (b) and performs by the binarization circuit 96 the logical OR on the results obtained in the configurations of (a) and (b) to produce a regionsegmented binary image, which is then stored in the binary image memory 98.

By using the region-segmented binary images stored in the binary image memories 98 in the configurations (a) to (d), feature parameters associated with the object regions where particles exist are determined by the computation means (not shown in FIG. 32) to discriminate the urine sediment particles.

We claim:

1. A region segmentation method for particle images comprising:

photographing and storing as static images a red component image (red-colored image), a green component image (green-colored image) and a blue component image (blue-colored image) of stained and non-stained object particles supplied through an image input optical system;

a first process of setting a first group of thresholds in density value for a first group of two or more images selected from the red-colored image, green-colored image and blue-colored image to discriminate between a background region and object regions where the object particles exist, and to extract the object regions differing in density from the background region, and producing a first binary image from the first group of two or more images, wherein the first group of thresholds are low thresholds and high thresholds in density value and the first group of thresholds are set for the two or more images of the first group and density values of pixels of the extracted object regions are lower than the low thresholds or higher than the high thresholds in the two or more images of the first group;

a second process of calculating for each pixel a quantity representing the magnitude of change of density in an area neighboring each of the pixels making up a single image selected from the first group of images, comparing a change of density in the background region with the quantity representing the magnitude of change of density calculated for each pixel, setting a second group of thresholds for extracting object regions whose change of density is larger than that of the background region, and producing a second binary image from the single image; and a third process of performing a logic operation on the first binary image and the second binary image to produce a third binary image showing the background region and the object regions.

2. A region segmentation method for particle images according to claim 1, wherein the particle images are images of stained and non-stained urine sediment particles scattered in a flow.

3. A region segmentation method for particle images according to claim 1, wherein, prior to the first and second process, using a white image photographed when an object has a uniform and infinitely small light absorption and a black image photographed when an object has an infinitely large light absorption, density irregularities which are caused by distortion of the image input optical system and which are present in the first group of images are corrected.

4. A region segmentation method for particle images according to claim 1, wherein the first group of images is the green-colored image and the redcolored image, and the single image is the green-colored image.

5. A region segmentation method for particle images according to claim 1, wherein at least a portion of the first process and the second process are parallelly executed.

6. A region segmentation method for particle images according to claim 1, wherein the first process and the second process are parallelly executed.

7. A region segmentation method for particle images according to claim 1, wherein the logic operation is a logical OR.

8. A region segmentation method for particle images according to claim 1, wherein either a difference between sums of density values of pixels contained in each of two small areas neighboring each of the pixels, or an absolute value of the difference between the density sums is taken as the quantity representing the magnitude of change of density.

9. A region segmentation method for particle images according to claim 8, wherein the small areas have a size of two to four pixels arranged onedimensionally in a specified direction in the single image.

10. A region segmentation method for particle images according to claim 1, wherein either a weighted sum of the density values of pixels in the small area neighboring each of the pixels or an absolute value of the weighted sum is taken as the quantity representing the magnitude of change of density.

11. A region segmentation method for particle images according to claim 10, wherein the small area has size of two to four pixels in a specified directions in the single image.

12. A region segmentation method for particle images according to claim 1, wherein either a variance or a standard deviation of distribution of density of pixels in the small areas neighboring each of the pixels is taken as the quantity representing the magnitude of change of density.

13. A region segmentation method for particle images according to claim 1, wherein the first process comprises a step of generating a density histogram for each of images of the first group of images to determine the low and high thresholds, wherein the low thresholds are lower than a maximum density value of the density histogram, and the high thresholds are higher than the maximum density value of the density histogram.

14. A region segmentation method for particle images comprising:

photographing and storing as static images a red component image (red-colored image), a green component image (green-colored image) and a blue component image (blue-colored image) of stained and non-stained object particles supplied through an image input optical system; a first process of correcting density irregularities present in a first group of two or more images selected from the red-colored image, green-colored image and blue-colored image using a white image photographed when an object has a uniform and infinitely small light absorption and a black image photographed when an object has an infinitely large light absorption, the density irregularities being caused by distortion of the image input optical system;

a second process of setting a first group of thresholds in density value for the first group of two or more images to discriminate between a background region and object regions where the object particles exist, and to extract the object regions differing in density from the background region, and producing a first binary image from the first group of images, wherein the first group of thresholds are low thresholds and high thresholds in density value and the first group of thresholds are set for the two or more images of the first group, and density values of pixels of the extracted object regions are lower than the low thresholds or higher than the high thresholds in the two or more images of the first group;

a third process of calculating for each pixel a quantity representing the magnitude of change of density in an area neighboring each of the pixels making up a single image selected from the first group of images, comparing a change of density in the background region with the quantity representing the magnitude of change of density calculated for each pixel, setting a second group of thresholds for extracting object regions whose change of density is larger than that of the background region, and producing a second binary image from the single image, the third process being performed in parallel with the second process; and a fourth process of performing a logic operation on the first binary image and the second binary image to produce a third binary image showing the background region and the object.

15. A region segmentation method for particle images according to claim 14, wherein the particle images are images of stained and non-stained urine sediment particles scattered in a flow.

16. A region segmentation method for particle images according to claim 14, wherein the first group of images is the green-colored image and the redcolored image, and the single image is the green-colored image.

17. A region segmentation method for particle images according to claim 14, wherein either a difference between sums of density values of pixels contained in each of two small areas neighboring each of the pixels, or an absolute value of the difference between the density sums is taken as the quantity representing the magnitude of change of density.

18. A region segmentation method for particle images according to claim 17, wherein the small areas have a size of two to four pixels arranged onedimensionally in a specified direction in the single image.

19. A region segmentation method for particle images according to claim 20, wherein the first process comprises a step of generating a density histogram for each of images of the first group of images to determine the low and high thresholds, wherein the low thresholds are lower than a maximum density value of the density histogram, and the high thresholds are higher than the maximum density value of the density histogram.

20. A region segmentation apparatus for particle images comprising:

an image input optical system for inputting particle images;

a means to generate a red-colored image, the green-colored image and a blue-colored image of stained and non-stained object particles as static images;

a memory means to store image data of the red-colored image, green-colored image and blue-colored image;

a first binarization means to set a first group of thresholds in density value for a first group of two or more images selected from the red-colored image, green-colored image and blue-colored image to discriminate between a background region and object regions where the object particles exist, and to extract object regions differing in density from the background region, and producing a first binary image from the first group of images, wherein the first group of thresholds are low thresholds and high thresholds in density value and the first group of thresholds are set for the two or more images of the first group, and density values of pixels of the extracted object regions are lower than the low thresholds or higher than the high thresholds in the two or more images of the first group;

a second binarization means to calculate for each pixel a quantity representing the magnitude of change of density in an area neighboring each of the pixels making up a single image selected from the first group of images, to compare a change of density in the background region with the quantity representing the magnitude of change of density calculated for each pixel, to set a second group of thresholds for extracting object regions whose change of density is larger than that of the background region, and to produce a single image; and a third binarization means to perform a logic operation on the first binary image and the second binary image to produce a third binary image showing the background region and the object regions.

21. A region segmentation apparatus for particle images according to claim 20, wherein the particle images are images of stained and non-stained urine sediment particles scattered in a flow.

22. A region segmentation apparatus for particle images according to claim 20, further comprising a means to correct density irregularities present in the first groupl of images using a white image photographed when an object has a uniform and infinitely small light absorption and a black image photographed when an object has an infinitely large light absorption, the density irregularities being caused by distortion of the image input optical system.

23. A region segmentation apparatus for particle images according to claim 20, wherein the first group of images is the green-colored image and the redcolored image, and the single image is the green-colored image.

24. A region segmentation apparatus for particle images according to claim 20, wherein at least a portion of an operation of each of the first binarization means and the second binarization means are at least parallelly operated.

25. A region segmentation apparatus for particle images according to claim 20, wherein the first binarization means and the second binarization means are at least parallelly operated.

26. A region segmentation apparatus for particle images according to claim 20, wherein the logic operation in the third binarization means is a logical OR.

27. A region segmentation apparatus for particle images according to claim 20, further comprising a means to determine either a difference between sums of density values of pixels contained in each of two small areas neighboring each of the pixels or an absolute value of the difference between the density sums, wherein either the difference between the density sums or the absolute value of the difference is taken as the quantity representing the magnitude of change of density.

28. A region segmentation apparatus for particle images according to claim 27, wherein the small areas have a size of two to four pixels arranged one-dimensionally in a specified direction in the single image.

29. A region segmentation apparatus for particle images according to claim 20, further comprising a means to determine either a weighted sum of the density values of pixels in the small area neighboring each of the pixels or an absolute value of the weighted sum, wherein either the weighted sum or the absolute value of the weighted sum is taken as the quantity representing the magnitude of change of density.

30. A region segmentation apparatus for particle images according to claim 29, wherein the small area has size of two to four pixels in a specified directions in the group image.

31. A region segmentation method for particle images according to claim 20, further comprising a means to determine either a variance or a standard deviation of distribution of density of pixels in the small areas neighboring each of the pixels, wherein either the variance or the standard deviation is taken as the quantity representing the magnitude of change of density.

32. A region segmentation apparatus for particle images according to claim 20, wherein the first binarization means comprises a threshold calculating unit to generate a density histogram for each of images of the first group of images and to determine the low and high thresholds, wherein the low thresholds are lower than a maximum density value of the density histogram, and the high thresholds are higher than the maximum density value of the density histogram.

33. A region segmentation apparatus for particle images comprising:

an image input optical system for inputting particle images;

a means to generate a red-colored image, a green-colored image and a blue-colored image of stained and non-stained object particles as static images;

a memory means to store image data of the red-colored image, green-colored image and blue-colored image;

a means to correct density irregularities present in a first group of two or more images selected from using a white image photographed when an object has a uniform and infinitely small light absorption and a black image photographed when an object has an infinitely large light absorption, the density irregularities being caused by distortion of the image input optical system;

a first binarization means to set a first group of thresholds in density value for the first group of images to discriminate between a background region and object regions where the object particles exist, and to extract object regions differing in density from the background region, and producing a first binary image from the first group of two or more images wherein the first group of thresholds are low thresholds and high thresholds in density value and the first group of thresholds are set for the two or more images of the first group, and density values of pixels of the extracted object regions are lower than the low thresholds or higher than the thresholds in the two or more images of the first group;

a second binarization means to calculate for each pixel a quantity representing the magnitude of change of density in an area neighboring each of the pixels making up a single image selected from the first group of images, to compare a change of density in the background region with the quantity representing the magnitude of change of density calculated for each pixel, to set a second group of thresholds for extracting object regions whose change of density is larger than that of the background region, and to produce a second binary image from the single image, the second binarization means being operated in parallel with the first binarization means; and a third binarization means to perform a logic operation on the first binary image and the second binary image to produce a third binary image showing the background region and the object regions.

34. A region segmentation apparatus for particle images according to claim 33, wherein the particle images are images of stained and non-stained urine sediment particles scattered in a flow.

35. A region segmentation apparatus for particle images according to claim 33, wherein the first group of images is the green-colored image and the redcolored image, and the single image is the green-colored image.

36. A region segmentation apparatus for particle images according to claim 33, further comprising a means to determine either a difference between sums of density values of pixels contained in each of two small areas neighboring each of the pixels or an absolute value of the difference between the density sums, wherein either the difference between the density sums or the absolute value of the difference is taken as the quantity representing the magnitude of change of density.

37. A region segmentation apparatus for particle images according to claim 36, wherein the small areas have a size of two to four pixels arranged one-dimensionally in a specified direction in the single image.

38. A region segmentation apparatus for particle images according to claim 33, wherein the first binarization means comprises a threshold calculating unit to generate a density histogram for each of images of the first group of images and to determine the low and high thresholds, wherein the low thresholds are lower than a maximum density value of the density histogram, and the high thresholds are higher than the maximum density value of the density histogram.

39. A region segmentation method for particle images comprising:

photographing and storing as static images a red component image (red-colored image), a green component image (green-colored image) and a blue component image (blue-colored image) of stained and non-stained object particles supplied through an image input optical system;

a first process of setting a first group of thresholds in density value for two images selected from the red-colored image, green-colored image and blue-colored image to discriminate between a background region and object regions where the object particles exist, and to extract object regions differing in density from the background region, and producing a first binary image from the two images, wherein the first group of thresholds are low thresholds and high thresholds in density value and the first group of thresholds are set for each of the two images, and density values of pixels of the extracted object regions are lower than the low thresholds or higher than the high thresholds;

a second process of calculating for each pixel a quantity representing the magnitude of change of density in an area neighboring each of the pixels making up single image selected from the two images, comparing a change of density in the background region with the quantity representing the magnitude of change of density calculated for each pixel, setting a second group of thresholds for extracting object regions whose change of density is larger than that of the background region, and producing a second binary image from the single image; and a third process of performing a logical OR operation on the first binary image and the second binary image to produce a third binary image showing the background region and the object regions.

40. A region segmentation method for particle images comprising:

photographing and storing as static images a red component image (red-colored image), a green component image (green-colored image) and a blue component image (blue-colored image) of stained and non-stained object particles supplied through an image input optical system;

a first process of correcting density irregularities present in two images selected from the red-colored image, green-colored image and blue-colored image using a white image photographed when an object has a uniform and infinitely small light absorption and a black image photographed when an object has an infinitely large light absorption, the density irregularities being caused by distortion of the image input optical system;

a second process of setting a first group of thresholds in density value for two images to discriminate between a background region and object regions where the object particles exist, and to extract object regions differing in density from the background region, and producing a first binary image from the two images, wherein the first group of thresholds are low thresholds and high thresholds in density value and the first group of thresholds are set for each of the two images, and density values of pixels of the extracted object regions are lower than the low thresholds or higher than the high thresholds;

a third process of calculating for each pixel a quantity representing the magnitude of change of density in an area neighboring each of the pixels making up single image selected from the two images, comparing a change of density in the background region with the quantity representing the magnitude of change of density calculated for each pixel, setting a second group of thresholds for extracting object regions whose change of density is larger than that of the background region, and producing a second binary image from the single image, the third process being performed in parallel with the second process; and a fourth process of performing a logical OR operation on the first binary image and the second binary image to produce a third binary image showing the background region and the object regions.

41. A region segmentation apparatus for particle images comprising:

an image input optical system for inputting particle images;

a means to generate a red-colored image, a green-colored image and a blue-colored image of stained and non-stained object particles as static images;

a memory means to store image data of the red-colored image, green-colored image and blue-colored image;

a first binarization means to set a first group of thresholds in density value for two images selected from the red-colored image, green-colored image and blue-colored image to discriminate between a background region and object regions where the object particles exist, and to extract object regions differing in density from the background region, and producing a first binary image from the two images, wherein the first group of thresholds are low thresholds and high thresholds in density value and the first group of thresholds are set for each of the two images, and density values of pixels of the extracted object regions are lower than the low thresholds or higher than the high thresholds;

a second binarization means to calculate for each pixel a quantity representing the magnitude of change of density in an area neighboring each of the pixels making up single image selected from the two images, to compare a change of density in the background region with the quantity representing the magnitude of change of density calculated for each pixel, to set a second group of thresholds for extracting object regions whose change of density is larger than that of the background region, and to produce a second binary image from the single image; and a third binarization means to perform a logical OR operation on the first binary image and the second binary image to produce a third binary image showing the background region and the object regions.

42. A region segmentation apparatus for particle images comprising:

an image input optical system for inputting particle images;

a means to generate a red-colored image, a green-colored image and a blue-colored image of stained and non-stained object particles as static images;

a memory means to store image data of the red-colored image, green-colored image and blue-colored image;

a means to correct density irregularities present in two images selected from the red-colored image, green-colored image and blue-colored image using a white image photographed when an object has a uniform and infinitely small light absorption and a black image photographed when an object has an infinitely large light absorption, the density irregularities being caused by distortion of the image input optical system;

a first binarization means to set a first group of thresholds in density value for the two images to discriminate between a background region and object regions where the object particles exist, and to extract object regions differing in density from the background region, and producing a first binary image from the two images, wherein the first group of thresholds are low thresholds and high thresholds in density value and the first group of thresholds are set for each of the two images, and density values of pixels of the extracted object regions are lower than the low thresholds or higher than the high thresholds;

a second binarization means to calculate for each pixel a quantity representing the magnitude of change of density in an area neighboring each of the pixels making up single image selected from the two images, to compare a change of density in the background region with the quantity representing the magnitude of change of density calculated for each pixel, to set a second group of thresholds for extracting object regions whose change of density is larger than that of the background region, and to produce a second binary image from the single image, the second binarization means being operated in parallel with the first binarization means; and a third binarization means to perform a logical OR operation on the first binary image and the second binary image to produce a third binary image showing the background region and the object regions.

43. A region segmentation method for particle images comprising:

photographing and storing as static images a red component image (red-colored image), a green component image (green-colored image) and a blue component image (blue-colored image) of stained and non-stained object particles supplied through an image input optical system;

a first process of correcting density irregularities present in the red-colored image and the green-colored image using a white image photographed when an object has a uniform and infinitely small light absorption and a black image photographed when an object has an infinitely large light absorption, the density irregularities being caused by distortion of the image input optical system;

a second process of setting a first group of thresholds in density value for the red-colored image and green-colored image to discriminate between a background region and object regions where the object particles exist, and to extract object regions differing in density from the background region, and producing a first binary image from the red-colored image and greencolored image, wherein the first group of thresholds are low thresholds and high thresholds in density value and the first group of thresholds are set for the red-colored image and green-colored image, and density values of pixels of the extracted object regions are lower than the low thresholds or higher than the high thresholds;

a third process of calculating for each pixel a quantity representing the magnitude of change of density in an area neighboring each of the pixels making up the green-colored image, comparing a change of density in the background region with the quantity representing the magnitude of change of density calculated for each pixel, setting a second group of thresholds for extracting object regions whose change of density is larger than that of the background region, and producing a second binary image from the green-colored image, the third process being performed in parallel with the second process; and a fourth process of performing a logical OR operation on the first binary image and the second binary image to produce a third binary image showing the background region and the object regions.

44. A region segmentation apparatus for particle images comprising:

an image input optical system for inputting particle images;

a means to generate a red-colored image and a green-colored image of stained and non-stained object particles as static images;

a memory means to store image data of the red-colored image and the green-colored image;

a means to correct density irregularities present in the red-colored image and the green-colored image using a white image photographed when an object has a uniform and infinitely small light absorption and a black image photographed when an object has an infinitely large light absorption, the density irregularities being caused by distortion of the image input optical system;

a first binarization means to set a first group of thresholds in density value for the red-colored image and green-colored image to discriminate between a background region and object regions where the object particles exist, and to extract object regions differing in density from the background region, and producing a first binary image from the red-colored image and green-colored image, wherein the first group of thresholds are low thresholds and high thresholds in density value and the first group of thresholds are set for the red-colored image and green-colored image, and density values of pixels of the extracted object regions are lower than the low thresholds or higher than the high thresholds;

a second binarization means to calculate for each pixel a quantity representing the magnitude of change of density in an area neighboring each of the pixels making up the green-colored image, to compare a change of density in the background region with the quantity representing the magnitude of change of density calculated for each pixel, to set a second group of thresholds for extracting object regions whose change of density is larger than that of the background region, and to produce a second binary image from the green-colored image, the second binarization means being operated in parallel with the first binarization means; and a third binarization means to perform a logical OR operation on the first binary image and the second binary image to produce a third binary image showing the background region and the object regions.

* * * * *